(12) United States Patent
Singhai et al.

(10) Patent No.: US 7,707,320 B2
(45) Date of Patent: Apr. 27, 2010

(54) COMMUNICATION BUFFER MANAGER AND METHOD THEREFOR

(75) Inventors: Sandeep Singhai, San Diego, CA (US); Nischal Abrol, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1003 days.

(21) Appl. No.: 10/655,659

(22) Filed: Sep. 5, 2003

(65) Prior Publication Data

US 2005/0055406 A1 Mar. 10, 2005

(51) Int. Cl.
*G06F 15/16* (2006.01)
(52) U.S. Cl. .................................... 709/250
(58) Field of Classification Search .................. 709/250
See application file for complete search history.

(56) References Cited

U.S. PATENT DOCUMENTS

| | | | | |
|---|---|---|---|---|
| 5,438,567 | A | * | 8/1995 | Ikeda .................... 370/417 |
| 6,286,762 | B1 | * | 9/2001 | Reynolds et al. ....... 235/472.01 |
| 2002/0002618 | A1 | | 1/2002 | Vange |
| 2003/0165160 | A1 | | 9/2003 | Minami et al. |
| 2004/0062267 | A1 | * | 4/2004 | Minami et al. ............. 370/463 |

FOREIGN PATENT DOCUMENTS

| | | |
|---|---|---|
| WO | 9927464 | 6/1999 |
| WO | 0135233 | 5/2001 |
| WO | 0176145 | 10/2001 |
| WO | 03045035 | 5/2003 |

OTHER PUBLICATIONS

International Search Report—PCT/US04/028578, International Searching Authority—European Patent Office, Nov. 16, 2004.
Written Opinion—PCT/US04/028578, International Searching Authority—European Patent Office, Nov. 16, 2004.

* cited by examiner

*Primary Examiner*—William C Vaughn, Jr.
*Assistant Examiner*—Scott Christensen
(74) *Attorney, Agent, or Firm*—Nicholas J. Pauley; Darren M. Simon

(57) ABSTRACT

Method for communication buffer management communicates messages between local and remote hosts. Socket, process buffer and reserve buffers allocated. Process and reserve buffers differentiated for transmit and receive. Global memory pool partitioned into process and reserve buffer pools; reserve buffer pool partitioned into transmit and receive pools. Messages stored in process buffer, but reserve buffer stores messages if low memory (POS). Communication system and mobile device include communication manager storing messages in process buffers; if POS exists, in reserve buffers. Communication buffer manager used for memory management, allocation, reclamation. Both adapt for static and dynamic memory management.

63 Claims, 5 Drawing Sheets

COMMUNICATION BUFFER MANAGER AND METHOD THEREFOR

FIELD OF THE INVENTION

The invention herein is related to telecommunication systems, particularly to wireless communications devices, and most particularly to memory-constrained communications devices.

BACKGROUND

Increasingly, mobile wireless devices communicate messages over heterogeneous connections, in which one or more constituent links include a public network, such as the Internet. The Internet is a loosely-organized international collaboration of autonomous, interconnected, packet-based networks, including wireless networks, which can be represented by a hierarchical, multilayer architecture, service descriptions, and protocols. Communication endpoints, or hosts, can be interconnected over a network using packet-switching computers called routers. To communicate using the Internet, a host typically implements a protocol from at least one layer of an Internet protocol suite. Each host and router executes one or more programs, or processes, which perform various tasks including information communication, processing, and display. An application is a process that operates at the topmost layer of the Internet protocol suite, and that may use a lower-layer transport protocol to provide transport layer communication services across distinct, but interconnected, networks. In turn, a transport protocol typically employs a network protocol to facilitate message transfer over a network between communicating processes. At the lowest layers, messages can be logically and physically transformed, and transported as electromagnetic or electro-optic signals through the networking media.

The predominant group of protocols used on the Internet is the Transmission Control Protocol/Internet Protocol (TCP/IP) protocol suite. The Transmission Control Protocol (TCP) is a connection-oriented, end-to-end, full-duplex, transport protocol providing reliable interprocess communication between pairs of host computer processes. A full-duplex protocol permits concurrent communication between connected hosts. A reliable protocol is one that provides a mechanism by which sender and receiver exchange information, directly or indirectly, about a communication state, such as a message delivery. Generally termed an "acknowledgement," or ACK, the mechanism may involve a variety of techniques, such as a formatted response, to convey the information desired for a given protocol. A connection-oriented protocol, TCP substantially assures message delivery by routing a bidirectional logical connection between communicating hosts over a network prior to data transmission, and communicates using messages of formatted data units, called TCP segments. An end-to-end protocol typically invests responsibility for communication integrity, security, and flow management in the communicating hosts, and not in intermediate gateways or routers. However, such end-to-end protocols can be disrupted by delays or interruptions in one of the intermediate links or routers, which connect the hosts. To improve robustness of the communication system, routers often use connectionless network-layer protocols, which forward each message, or data unit, independently of others.

Internet Protocol (IP) is a network protocol, in which each message is identified by a destination address, namely the destination host IP address. IP is a connectionless (stateless) protocol with no end-to-end segment delivery guarantees. Independently transmitted TCP segments may be forced to contend for the use of network resources as they are routed through the network, and may arrive at the destination host damaged, duplicated, out of order, or not at all. Thus, higher-layer processes, such as an application or TCP process, typically would assume responsibility to correctly receive, reorder, repair, acknowledge, and request re-transmission of, the segments, or messages, conveyed by IP. Implicitly, although TCP/IP can be a reliable, robust communication protocol suite, the actual flow of messages during a communication may be bursty, that is, subject to wide variations in the volume of messages being transmitted at a given moment. At one extreme, a surging message volume may temporarily exceed the ability of a host to receive and process messages. At another, substantial pause between consecutive messages during a period of diminished message may incorrectly indicate that communications have ceased or the intervening link has been terminated.

When an application program, or process, (e.g., HTTP) communicates with another host, using TCP/IP-like protocols, the transport-layer processes (e.g., TCP) on either endpoint connect with the respective application using an interface called a TCP socket, which includes an IP address and a TCP port number. An IP address usually is associated with a host, and a TCP port usually is associated with a particular communication function of a particular application process invoking the host transport process. By directing messages through a specific local host socket to a specific remote host socket, a local host is capable of communicating across a network with the remote host.

Typically, a communication buffer is created for each host socket, as a transport-layer connection is established between hosts. A communication buffer can be used to offset various irregularities and burstiness in message communication, arising from the nature of the communicating hosts, the methods used to communicate, and the conditions of the network connections intervening between the hosts. A buffer can be composed of multiple memory objects, which can be arranged in logical data structures and units, and disposed to store information therein. During the communication, messages may be read from, and written to, each buffer. An exemplary BUFFER READ can be an operation in which data is transferred from a buffer to an executing application (process); and an exemplary BUFFER WRITE can be an operation in which data is transferred from a process to a buffer.

TCP is one of many communication protocols, well-known in the network and communication arts, which attempt to assure message delivery using positive acknowledgement-based controls. In sender-initiated acknowledgement protocols, each sending endpoint of a communication, whether client or server, retains a copy of transmitted messages for possible re-transmission until the corresponding receiving endpoint ACKs the particular message. When the recipient acknowledges receipt, the sender may release the memory objects in which the retained copies are stored. If a proper acknowledgement is not received, the sending endpoint may re-transmit messages beginning at the point of the last proper ACK. Multiple messages, e.g., TCP segments, may be transmitted, with each sender accumulating copies of sent messages until corresponding ACKs are received. In view of the bursty nature of Internet communications, the ACK-related retention of previously transmitted messages, and the ability of hosts to transmit multiple messages, there may be a risk that either, or both, host can temporarily be overwhelmed by the number of segments being processed, received, and transmitted at a given time. During a communication, a remote host can function as a server to a client local host, and vice versa, with roles changing during the course of a communication. With full-duplex communications, hosts may communicate messages concurrently. However, a client or a server often cannot perform two transactions internally at once—for example, a BUFFER READ cannot be performed on a host buffer concurrently with a BUFFER WRITE, and vice versa. This aspect also may lend to a host being temporarily overwhelmed, for example, during a period of high message volume.

Relative to other communication systems, mobile devices are often memory-constrained, with limited available communication memory space. Such constraints may adversely affect flow control and buffer management under some conditions. For example, memory-constrained devices may be susceptible to message flow anomalies such as buffer deadlock and buffer starvation. Buffer deadlock may occur when an executing process waits for a resource that may never be available. Similarly, buffer starvation may occurs when an executing process under some circumstances, may block for a long period of time or forever waiting for a resource that may never be available. Certain mobile device application processes are configured to defer performing a BUFFER READ operation on a communication buffer until an in-progress BUFFER WRITE operation has completed. As such application processes execute, stored TCP segments can accumulate in both transmit and receive buffers of the mobile device, leading to exhaustion of the available communication memory space. With the memory space exhausted, the process may be unable to complete an in-progress BUFFER WRITE. At the same time, the application process awaits the completion of the BUFFER WRITE to perform a BUFFER READ operation. The stalemate that develops is termed a deadlock. Typically, for some period after a deadlock develops, the mobile device halts communication while keeping open the TCP connection. Many TCP protocols and processes can provide timeout mechanisms, in which the TCP connection between the mobile device and the server is closed after a predetermined timeout period, on the order of several seconds. Nevertheless, deadlock and TCP timeout mechanisms can waste substantial system resources, and it is desirable to reduce their occurrence.

SUMMARY

The present invention provides communication methods and communication buffer management methods, along with communication systems and communication devices, such as mobile communication devices. The communication buffer management techniques herein constitute methods for communicating a message between a local host and a remote host having a remote host interface. Such methods include allocating a communication control data structure to a local host interface; allocating a process buffer to the communication control data structure for storing the message; and allocating a reserve buffer to the communication control structure. The communication control data structure is stored in an allocated memory object, and corresponds to the local host interface. The local host interface is disposed in the local host.

During communication, a message is stored in the process buffer. However, in response to a predetermined operational state, the reserve buffer can be used to store the message. The communication control data structure, the process buffer, and the reserve buffer are allocated from unallocated free memory objects disposed in a global memory pool, after which, the memory objects the communication control data structure, the process buffer, and the reserve buffer are designated as allocated memory objects in the global memory pool.

Multiple process buffers may be allocated from unallocated free memory objects to the communication control data structure, with selected ones being designated as transmit process buffers. The transmit process buffers store messages being transmitted from the local host to the remote host. Similarly, of the multiple process buffers allocated, selected others can be designated as receive process buffers. The receive process buffers store messages being received from the remote host by the local host. Furthermore, multiple reserve buffers can be allocated from unallocated free memory objects to the communication control data structure, with selected ones being designated as transmit reserve buffers. As with the multiple process buffers, selected others can be designated as receive reserve buffers. The reserve buffers can be associated with particular process buffers. That is, selected transmit reserve buffers can be associated with respective transmit process buffers, and selected receive reserve buffers can be associated with respective receive process buffers. As their name implies, reserve buffers can be held in reserve until the predetermined operational state exists. The predetermined operational state can be representative of unallocated free memory being less than a predetermined memory limit. Usefully, the local interface can be a socket, such as a TCP socket, and the communication control data structure can be a socket control block (SCB), such as a TCP SCB. The method also can include managing both allocated and unallocated memory objects in the global memory using dynamic memory allocation, dynamic memory reclamation, or a combination thereof, thereby maximizing unallocated free memory represented by the unallocated memory objects.

Certain methods include partitioning the global memory pool into a process buffer pool BP and a reserve buffer pool BR. In such cases, process buffers can be allocated from the designated process buffer pool BP and reserve buffers can be allocated from the designated reserve buffer pool BR. This technique can be useful, for example, when it is desirable to ensure a determinable minimum of memory be set aside for reserve buffers, as well as process buffers and communication control data structures. Methods also include creating additional control data structures, process buffers, and reserve buffers, responsive to a request for each resource entity, thereby allowing a process to invoke additional resources, as necessary, if so configured. In these methods, reserve buffers are put into service in response to the existence of a predetermined memory state.

The certain methods further can include establishing a communication link across a computer network between the local host and the remote, as well as storing a transmit message in a transmit process buffer before transmitting the transmit message, storing a receive message in a receive process buffer after receiving the receive message from the remote host, or both.

Certain methods also can include monitoring for the existence of predetermined memory state. Monitoring may be of pool BP, or of pool BP in cooperation with a free memory pool. If the predetermined memory state exists, then a transmit message can be stored in a transmit reserve buffer before transmitting the transmit message to the remote host; a receive message can be stored in a receive reserve buffer after receiving the receive message from the remote host; or both. The process pool pool BP includes free memory locations, committed memory locations, and a combination thereof, in which the predetermined memory state exists if free memory locations is less than a predetermined memory level, L.

Conveniently, certain embodied methods include establishing the communication link between the local host interface and the remote host interface using a predetermined transport-layer protocol. Also, the local host interface can be a socket, and the communication control data structure can be a socket control block. Moreover, certain methods include communicating across physical air interface Um as a portion of the network communication link, using a predetermined wireless protocol.

Certain other methods herein additionally include associating selected transmit process buffers, transmit reserve buffers, receive process buffers, and receive reserve buffers with respective communication control data structures in response to a selected memory management policy. In accordance with the selected memory management policy, the association can be effected by designating ones of selected committed memory transmit process buffers as selected free memory transmit process buffers and associating the selected free memory transmit process buffers with free memory of pool BP; by designating ones of selected committed memory transmit reserve buffers as selected free memory transmit reserve buffers and associating the selected free memory transmit reserve buffers with free memory of pool BR; by designating ones of selected committed memory receive process buffers as selected free memory receive process buffers and associating the selected free memory receive process buffers with free memory of pool BP; by designating ones of selected committed memory receive reserve buffers as selected free memory receive reserve buffers and associating the selected free memory receive reserve buffers with free memory of pool BR; or by some combination thereof.

The selected memory management policy used can be dynamic memory management including one of dynamic memory allocation, dynamic memory reclamation, and a combination thereof. The dynamic memory management is adapted to selectively change buffer allocation from a first communication control data structure to a second communication control data structure. Also, the dynamic memory management is adapted to selectively change reserve buffer association from a first process buffer to a second process buffer. In addition, selected memory management policy is configured to maximize free memory. The method also includes establishing a communication link in a communication network using a predetermined network-layer protocol, such as the Internet Protocol; a predetermined transport-layer protocol, such as Transport Control Protocol; and the predetermined network-layer protocol in combination with the predetermined transport-layer protocol, such as using TCP/IP. Where a portion of the communication link includes a physical air interface Um, a predetermined wireless protocol can be used to traverse that portion.

Still other certain embodied methods herein further can include cooperative memory management techniques, in which process buffers and reserve buffers cooperate to exchange messages between the local process and the remote process if a predetermined memory state exists. In a cooperative arrangement, a message is communicated through a process buffer, if available, or the associated reserve buffer, if not. Thus, if the predetermined memory state exists, a transmit process buffer can still store transmit messages unless full, in which case the associated transmit reserve buffer can store the transmit message. Likewise, a receive process buffer can still store receive messages unless full, in which case the associated receive reserve buffer can store the receive message.

In addition to encompassing partitioning memory into process buffer pool BP and reserve buffer pool BR, the methods herein also can provide partitioning buffer pool BR into transmit reserve buffer pool TS and receive reserve buffer pool RS. In general, the number of memory locations in BR can comprehend the sum of the number of memory locations respectively represented by transmit reserve buffer pool TS and receive reserve buffer pool RS. Moreover, where N is a selected maximum number of sockets created, subscript s may be representative of a socket index having a value in the approximate range of about $1 \leq s \leq N$. It may be advantageous to allocate the transmit and receive buffers for a socket s from BP when the amount of unallocated free memory is at least about a predetermined free memory level, L. On the other hand, it may be desirable to allocate transmit buffers from TS and receive buffers from RS, respectively, when the amount of unallocated free memory is less than about a predetermined free memory level, L.

Prior to the unallocated free memory diminishing to less than a predetermined memory level, transmit reserve buffers and receive reserve buffers may freely be allocated from process buffer pool BP. When unallocated free memory diminishes to less than a predetermined memory level, the method can include allocating reserve buffers from reserve buffer pool BR. In certain embodiments, allocation from the reserve buffer pool BR can include allocating transmit reserve buffers from transmit reserve buffer pool TS, and allocating receive reserve buffers from receive reserve buffer pool RS. As with other methods embodied herein, the aforementioned methods can include managing memory in the communication buffer, the process buffer, and the reserve buffer using memory allocation, memory reclamation, or a combination thereof.

The present invention also provides communication buffer manager apparatus, certain of which can be embodied in a communication system between a local host and a remote host. Such a system includes a communication manager in the local host, which is adapted to communicate a message with the remote host. The communication manager includes a process buffer configured to store the message communicated with the remote host; and a reserve buffer configured to store the message upon the existence of a predetermined operational state. The system also includes a network communication link, established to communicate the message between the local host and the remote host; and a transceiver, coupled between the communication manager and the network communication link, and disposed to transfer the message between the network communication link and the communication manager.

The communication manager also may include a communication interface and a communication control data structure. The communication interface can be connected to the local process, and can be adapted to exchange messages between the local process and process buffer or the reserve buffer. The communication control data structure can be characteristic of, and allocated to, the communication interface. In turn, the process buffer and the reserve buffer may be allocated to the communication control data structure. The communication manager can include therein a communication buffer. The communication buffer may encompass both allocated memory objects and unallocated free memory, alone and in combination. The communication control data structure, the process buffer, and the reserve buffer, may each be allocated memory objects in the communication buffer. In such communications managers, the predetermined operational state may exist when unallocated free memory is less than about a predetermined free memory level.

A communication buffer manager can be included in the communication manager, and connected to the communication buffer. The communication buffer manager can monitor unallocated free memory for the existence of the predetermined operational state and, in response thereto, may store a message in a reserve buffer. Multiple process buffers and reserve buffers can be allocated to the communication control data structure, with ones of the process buffers being designated transmit process buffers and others being designated receive process buffers. Multiple reserve buffers can be allocated to the communication control data structure, as well, with ones of the reserve buffers being designated transmit reserve buffers and others being designated receive reserve buffers. Selected transmit reserve buffers are cooperatively associated with respective transmit process buffers and selected receive reserve buffers are cooperatively associated with respective receive process buffers. The communication buffer can be partitioned into a process buffer pool BP and a reserve buffer pool BR, from which process and reserve buffers are respectively allocated. In certain systems embodied herein, the local host may communicate messages with the remote host over the network communication link using a predetermined network-layer protocol, in combination with a predetermined transport-layer protocol. In selected systems herein, the communication control data structure can be a TCP socket control block, and the communication interface can be a Transport Control Protocol socket. Moreover, the predetermined network-layer protocol can be a Transport Control Protocol. Where a portion of the network communication link traverses a physical air (Um) interface, the local host may communicate messages with the remote host over the Um interface, using a predetermined wireless protocol.

Other exemplary embodiments of the invention include a mobile communication device, having a transceiver and a communication manager disposed therein. The transceiver can be adapted to couple to a remote host over a portion of a communication network link using a predetermined wireless protocol. The communication manager can be adapted to communicate messages with the remote host. The communication manager can include a communication buffer, which may have unallocated free memory and a reserve buffer allocated therein. The reserve buffer can store the messages communicated with the remote host in response to the unallocated free memory diminishing to less than a predetermined memory level. The communication buffer also can have a process buffer allocated therein which stores the messages communicated with the remote host, substantially independently of the unallocated free memory diminishing to less than a predetermined memory level. The process buffer can cooperate with the reserve buffer to store the messages communicated with the remote host in response to the unallocated free memory diminishing to less than the predetermined memory level. The communication buffer can be partitioned into a process buffer pool BP and a reserve buffer pool BR. The process buffer then can be allocated from the process buffer pool BP, and the reserve buffer is allocated from the reserve buffer pool BR.

After being allocated, a process buffer may further be allocated into a transmit process buffer and a receive process buffer. Likewise, the reserve buffer may further be allocated into a transmit reserve buffer and a receive reserve buffer. Advantageously, a transmit reserve buffer can be associated a transmit process buffer, and both may be configured to cooperatively store messages transmitted to the remote host. Also the receive reserve buffer can be associated with the receive process buffer, and both may be configured to cooperatively store messages received from the remote host.

Exemplary mobile devices as embodied herein also can include a local process executing on the local host, which can have a local process interface exchanging messages between the local process and the communication buffer; and a local host communication interface control structure corresponding to the local process interface, which can be configured to communicate messages with a remote process interface in the remote host. The local host communication interface control structure can communicatively cooperate with the process buffer and the reserve buffer, which buffers may be allocated to the local host communication interface control structure. The reserve buffer pool may be partitioned into a transmit reserve buffer pool TS and a receive reserve buffer pool RS. When unallocated free memory is approximately at or above a predetermined memory level, L, process buffers and reserve buffers may be allocated from free memory pool BP. After unallocated free memory diminishes to about less than the predetermined memory level, a transmit reserve buffer may be allocated from the transmit reserve buffer pool TS, and a receive reserve buffer may be allocated from receive reserve buffer pool RS.

Such mobile communication devices can include a communication buffer manager connected to the communication buffer. The communication buffer manager can partition a communication buffer into a transmit process buffer and a receive process buffer; allocate a process buffer into a transmit process buffer and a receive process buffer; allocate a reserve buffer into a transmit reserve buffer and a receive reserve buffer; monitor unallocated free memory; and can store a message in a transmit reserve buffer, a receive reserve buffer, or both, responsive to a unallocated free memory diminishing to less than a predetermined memory level.

Certain communication buffer managers may be configured to select the size, number, or both, of process buffers and of reserve buffers, responsive to an anticipated buffer size, an intended communication purpose of the local communication interface, a predetermined communication parameter, and a combination thereof. The communication buffer manager can implement dynamic memory allocation, dynamic memory reclamation, and a combination thereof, maximizing unallocated free memory. Also, the communication buffer manager can further include a process buffer manager and a reserve buffer manager. Among the techniques employed by the process buffer manager and the reserve buffer manager to manage the respective process buffer memory and reserve buffer memory may be memory allocation, memory reclamation, or a combination thereof. One or both of the process buffer manager and the reserve buffer manager can implement dynamic memory allocation, dynamic memory reclamation, or a combination thereof, maximizing unallocated free memory.

BRIEF DESCRIPTION OF THE DRAWINGS

The present invention will be more fully understood from the following detailed description of the embodiments thereof, taken together with the following drawings, wherein.

DETAILED DESCRIPTION OF THE EMBODIMENTS

Figure 1:
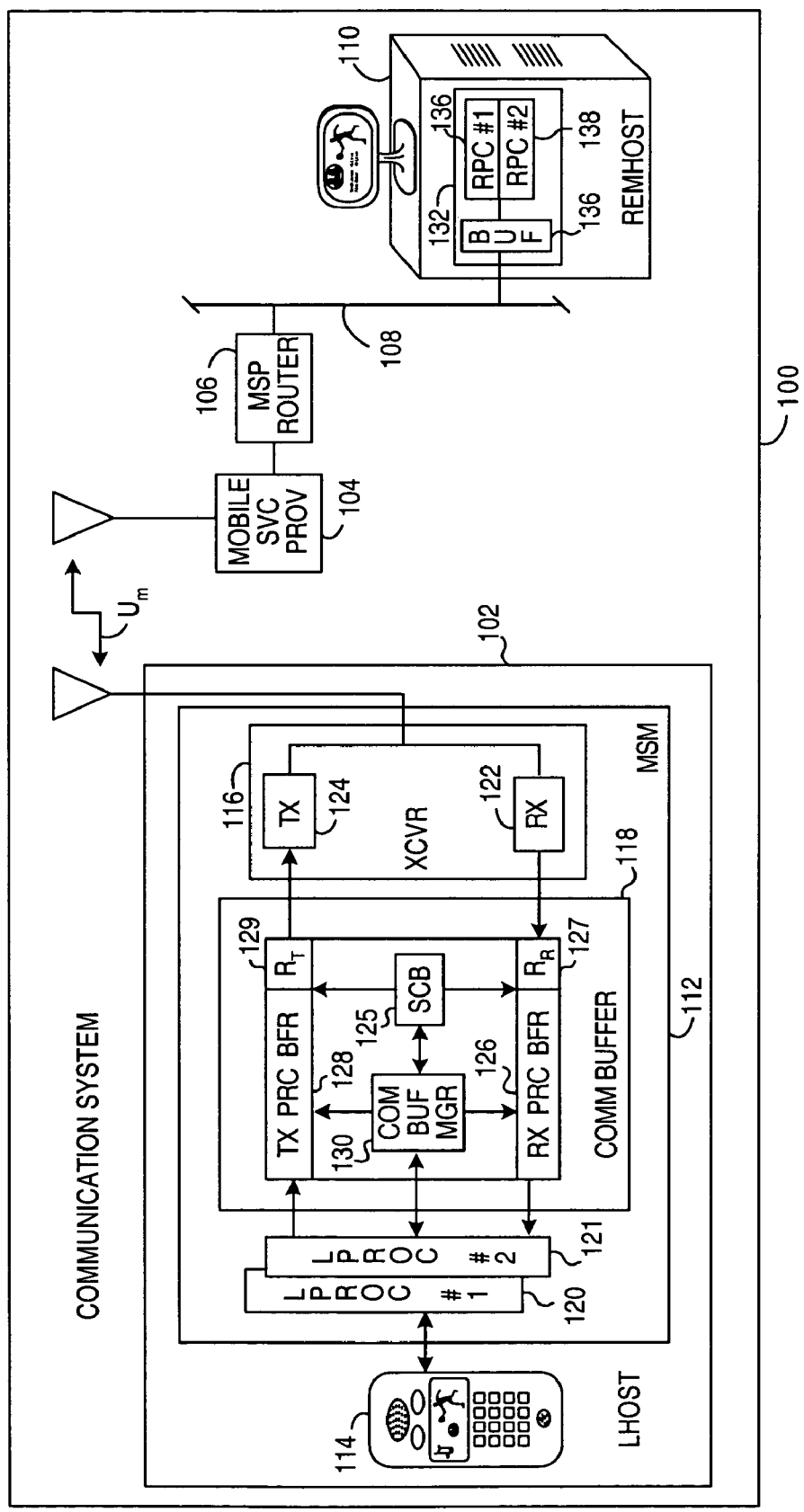
FIG. 1 is a simplified schematic block diagram illustrating an embodiment of a communication buffer manager in the context of a communication system.

The embodiments herein provide communication buffer management methods and apparatus, as may be used for managing a mobile device communications buffer in a mobile communications DEVICE.

1. Definition of Terms

As used herein, a message is an exemplary data unit transferred during a communication between two communication endpoints, or hosts. The constituent components of a message may be one or more data units, such as a TCP segment (segment). A TCP segment can include a TCP header and a TCP data payload (header and payload, respectively). Further, a message may be one or more data units of video, audio, text, data, multimedia, and other content significant to a host or a user of the host, including retransmissions and control messages. Messages may be formed of one or more data units, including, without limitation, data frames, packets, datagrams, delimited streams, administrative responses, and communication control data. Control messages may be in the form of positive or negative acknowledgements, status updates, requests, replies, and the like.

In general, a memory buffer, or simply, a buffer, can be apportioned from one or more memory blocks. Each memory block can be apportioned, in turn, from one or more unit memory locations. The number of unit memory locations constituting a memory block, as well as the number of memory blocks constituting a memory buffer may be fixed, selectable, variable, or a combination thereof. A fixed value is a single value, and typically assigned in advance of operations. A selectable value can be drawn from a discrete set of values, and often is assigned in advance of operations. A variable value assumes a value usually within a predetermined range, and often is assigned dynamically or during operations. Memory locations, memory blocks, and memory buffers all may be termed memory objects, unless the context calls for a specific memory entity. A buffer may be a single memory object and also may be apportioned from multiple, smaller memory objects.

Accordingly, a system memory buffer logically may contain a fixed number of smaller functional buffers, each effectively formed from a fixed number of unit memory locations. In the alternative, a system memory buffer may contain an aggregation of fixed-, selectable-, and variable-sized memory objects of differing size, which may be adapted to suit a particular purpose, to minimize wasted memory space, and the like. For example, all communication interface control structures may be allocated a memory object of one predetermined size, whereas a communication buffer may be composed of memory objects of different sizes, with an object size being adapted to facilitate efficient communication. The available physical communication memory space may be formed from or within a single integrated device, or from or within multiple integrated or discrete physical memory devices or modules. Furthermore, where advantageous hierarchical, distributed, or shared memory object configuration may be used.

Within the context of this disclosure, memory management can include memory allocation and memory reclamation. Memory allocation can include assigning memory resources for the storage of information, and may implement one or more memory allocation policies to provide sufficient resources to satisfy allocation requests expected during communications. Memory allocation policies well-known in the computer arts may be used, including without limitation, memory mapping and re-mapping, static memory allocation, dynamic memory allocation, and hybrid allocation, which can be a combination thereof.

It also may be desirable to include memory reclamation in memory management, to identify, collect, and recycle memory locations, blocks, and buffers, which may no longer be in use, or may better be utilized by a process different from the one to which it originally was allocated. A myriad of well-known memory reclamation techniques may be employed, alone or in combination, including without limitation, policy garbage collection, de-allocation, re-mapping, and memory recycling. These techniques may be integral with, or complimentary to, memory allocation techniques employed herein. Indeed, memory allocation can cooperate with memory reclamation to re-allocate memory locations, blocks, and buffers, as intended by the memory management strategy implemented in the respective embodiment.

Memory management also may include one or more predetermined memory management procedures under circumstances where memory allocation or memory reclamation may be impractical or limited. Predetermined memory management procedures may include, for example, dropping incoming receive messages or blocking outgoing transmit messages, if sufficient free memory may be temporarily unavailable.

Also as used herein, a "memory constrained" device may be a device having a limited memory space, or number of memory locations available for use as a communications buffer. Memory constraints in a compact, mobile communications device may arise, for example, from power, cost, or device size considerations. In the examples and embodiments that follow, the terms "local" and "remote" are used to provide relative reference points, and not to assign a particular physical or spatial relationship between communicating hosts. Indeed, embodiments of the present invention may be used in a local host, a remote host, or both.

Further, the terms "free" and "committed" as applied herein to memory entities, including memory locations, blocks, and buffers, respectively designate the memory entity as being in a state functionally similar to one of a "write-enable" state and "write-inhibit" state. In write-inhibited memory, new data storage may be temporarily prevented such that data existing in the memory entity may temporarily be preserved. A memory entity which is write-enabled may allow new data to be stored therein. Thus, data may be written into free memory, which then may be designated as committed memory, until the data in the memory have been used as desired, e.g., read, transmitted, or acknowledged. When committed memory may be underutilized, or may be no longer in use for its intended purpose, it again may be designated as free memory. It may be advantageous that a communication buffer consist of free memory, committed memory, or both.

It can be desirable to allocate a memory entity before storing data therein. Once the memory entity has been assigned to a particular process, the allocated memory may be designated as free memory or as committed memory, relative to the operational state of the respective process. Prior to reclamation, it is desirable to designate committed memory as free memory, for example, so that resources may not be removed prematurely from an active process. When a memory entity is designated as free memory, it can be returned to a free memory pool, if so configured, from which subsequent resources may be re-allocated.

Some processes may defer performing a BUFFER READ operation until the completion of a pending BUFFER WRITE operation. In such instances, a process may not read data that already may be received and, thus, may not free the associated memory locations for use by outgoing messages, or by incoming messages such as an ACK. Also, numerous communications protocols may expect a sender to retain copies of transmitted messages until the sender receives associated responses (e.g., ACKs) from the message recipient. As such processes execute, stored TCP segments may accumulate in both transmit and receive buffers of the mobile device, leading to substantial exhaustion of the available communication memory space. With the memory space exhausted, a process may be unable to complete an in-progress BUFFER WRITE operation. At the same time, a process may await the completion of the BUFFER WRITE to perform a BUFFER READ operation. The stalemate that develops can be termed a deadlock. Thus, efficient management of communications buffers can be desirable in a memory-constrained environment. Accordingly, the exemplary communication buffer management methods and apparatus herein are presented within the context of memory-constrained mobile wireless devices executing processes. However, these methods and apparatus may be implemented in a vast array of devices, systems, and environments.

2. Discussion Of Embodiments

FIG. 1 illustrates communication system 100, in which local host (LHOST) 102 communicates with remote host (REMHOST) 110 by establishing a communication link over communication network 108. LHOST 102 and REMHOST 110 can communicate by unidirectionally or bidirectionally transferring a message, including information and control data, in half-duplex or in full-duplex modes of transmission. A portion of the communication link may include a packet switched network, e.g., network 108, with communication there across generally employing communication protocols adapted for packet-switched networks. Network 108 can be representative of a heterogeneous network, with constituent network portions including, without limitation, circuit-switched networks, packet-switched networks, and equivalents and combinations thereof. Portions of network 108 that include a packet-switched public network, such as the Internet, may use reliable, connection-oriented, end-to-end protocols, such as the TCP/IP protocol suite. A portion of the communication link also may traverse a physical air (Um) interface using a predetermined wireless protocol. In system 100, the predetermined wireless protocol advantageously cooperates with other communication protocols used in the communication link, including packet-switched protocols.

LHOST 102 can be a mobile wireless system, which communicates with mobile service provider (MSP) 104. LHOST 102 may incorporate multifunction, multimedia mobile terminal (M3T) 114, such as a handset, personal digital assistant, or other compact communication device, which may be memory-constrained. LHOST 102 also may use mobile station manager (MSM) 112 to facilitate communication between M3T 114 and REMHOST 110. Although MSM 112 is shown in FIG. 1 as an entity separate from M3T 114, it also is contemplated that MSM 112 can be integrated into M3T 114. MSM 112 can include one or more communication buffers, such as communication process buffer 118. MSM 112 may be coupled to, or incorporate, mobile transceiver (XCVR) 116. In addition, MSM 112 can be coupled to one or more local processes, such as first local process (LPROC #1) 120 and second local process (LPROC #2) 121, an associated interface, or a service module, such as a TCP process. One or both of LPROC #1 120, LPROC #2 121 may provide networking communication services for a user application cooperating with M3T 114. It is within the scope of the inventive embodiments herein for LPROC #1 120, LPROC #2 121, to execute in MSM 112, or in M3T 114, alone or in combination.

XCVR 116 may include radio receiver 122 and radio transmitter 124. Transmitter 124 can transfer an outgoing message from transmit process buffer 128 to MSP 104 over the physical air (Um) interface. MSP 104 can subsume a base transceiver station (not shown) and a mobile switching center (not shown), and can be connected through MSP router 106 to network 108. MSP router 106 may perform physical signal and logical message transformations, as desired, between network 108 and MSP 104. Messages transfers between LHOST 102 and REMHOST 110 may be bidirectional and full duplex. Receiver 122 can receive an incoming wireless message from MSP 104, and can transfer the received message to receive process buffer 126.

Typically, at the beginning of a communication, processes executing on either host negotiate a connection there between, using a selected communication interface. In an example where each of REMHOST 110 and LHOST 102 use a TCP-like transport protocol to effect communication, each process may create one or more TCP sockets to establish a desired connection there between. Although communication buffer 118 may be representative of a memory object allocated for each socket Si created in LHOST 102, buffer 118 also may represent a memory object shared as a global memory pool by two or more sockets Si. These sockets may contend for allocation of memory resources during operation. As the TCP connection is being established, communicating TCP processes can identify port numbers and negotiate other parameters, for example, the maximum amount of transmitted but unacknowledged data (known as offered or advertised window) and the maximum size of TCP segments to be bidirectionally transferred between REMHOST 110 and LHOST 102. Such control information may be stored in a data structure called a socket control block (SCB) 125, which also may be created in a portion of communication buffer 118. In general, a socket Si can include SCB 125, and one or more process buffers, such as buffers 126, 128. It may be desirable to allocate receive process buffer 126 and transmit process buffer 128 from communication buffer 118. Process buffers 126, 128 may be configured in response to the anticipated communication needs, as may be reflected by parameters passed to SCB 125 during communication link negotiation. For example, the size and number of buffers and other memory objects allocated to SCB 125 may be responsive to the nature of the communication (e.g., TCP, UDP, etc.), the anticipated memory demands (e.g., communication priority, TCP segment size, etc.), and other germane operational parameters. Although SCB 125, receive process buffer 126, and transmit process buffer 128 are depicted as being physically separate entities, the distinction typically is virtual.

REMHOST 110 includes communication buffer 134, also allocated into a receive process buffer (not shown) and a transmit process buffer (not shown). Buffer 134 can be connected to a first remote process (RPC #1) 136, a second remote process (RPC #2) 138, or both. REMHOST 110 may include multiple buffers, such as buffer 134, to support multiple sockets and multiple processes. Also, multiple local processes (e.g., LPROC #1 120, LPROC #2 121) in LHOST 102 can be adapted to communicate with multiple remote processes (e.g., RPC #1 136, RPC #2 138) in REMHOST 110, or in a combination of different remote hosts.

LPROC #1 120 receives outgoing messages from M3T 114 and writes the messages into free memory of transmit process buffer 128. Transmitter 124 reads messages from transmit process buffer 128 and may transmit them to MSP 104 over the Um interface. After a message is transmitted from LHOST 102 to REMHOST 110, a transmitted message copy can be stored in a selected memory object in buffer 128, pending acknowledgement. The memory objects into which the messages can be written may be designated as committed memory, until the messages are transmitted and acknowledged, after which they may be re-designated as free memory. Whether the memory object(s) constituting buffer 128 are designated as committed memory or as free memory, it nevertheless may remain allocated to SCB 125, as buffer 128, unless reclaimed. As communications between LHOST 102 and REMHOST 110 continue, the amount of free memory in transmit process buffer 128, relative to the amount of committed memory and total memory, may vary containing, for example, both outgoing messages received from process 120 and copies of transmitted, but unacknowledged, messages sent to REMHOST 110.

LHOST 102 also may receive messages from REMHOST 110, substantially concurrently with LHOST 102 transmitting messages to REMHOST 110. In general, messages outgoing from REMHOST 110 to LHOST 102 may be stored prior to transmission in REMHOST buffer 134, for example, as TCP segments. The outgoing messages may be transmitted across network 108 and to MSP 104, through MSP router 106. MSP 104 can transmit the messages over the Um interface to LHOST 102, using the preselected wireless communication protocol. Radio receiver 122 in LMHOST 102 can detect incoming signals and can convert the physical signals into logical received messages, e.g., TCP segments. A received TCP segment typically consists of a received payload and a received header, which contains a received message identifier. Generally, received messages can be stored in receive process buffer 126 until process 120 requests selected received information. Responsive to a process BUFFER READ operation, the received payloads stored in receive process buffer 126 can be transferred to process 120, and the data can made available for use, for example, by M3T 114. After a BUFFER READ, committed memory in buffer 126 can be designated as free memory. Whether the memory object(s) constituting buffer 126 are designated as committed memory or as free memory, it nevertheless may remain allocated to SCB 125, as buffer 126, unless reclaimed. As communications between REMHOST 110 and LHOST 102 continue, the amount of free receive memory in receive process buffer 126, relative to the amount of committed receive memory, may vary, particularly where a process, such as LPROC #1 120, LPROC #2 121, defers performing a BUFFER READ operation receive process buffer 128 until an in-progress BUFFER WRITE operation completes. LHOST 102 also may respond to transmissions from REMHOST 110 by sending an ACK to confirm the receipt of those transmissions.

It may be desirable that an embodiment of communication buffer manager (CBM) 130, or a functional equivalent, provide improved management of memory objects within communication buffer 118. Memory management which can be implemented in CBM 130 includes memory allocation, memory reclamation, and memory management procedures. Memory allocation may include differentially allocating memory objects for transmit operations or for receive operations. Memory management also can include designating allocated memory objects as free memory or as committed memory. Thus, examples of the memory objects managed by CBM 130 can include communication buffer 118, SCB 125, receive process buffer 126, and transmit process buffer. Additionally, CBM 130 can manage memory objects including reserve buffers such as receive reserve buffer RR 127 and transmit receive buffer RT 129.

Memory reclamation can include identifying unused memory objects and reclaimable memory objects. It may be desirable that reclaimed memory objects be returned to the defined, free memory pool. Examples of unused memory objects can be unallocated memory, allocated and free memory objects and buffers no longer in use, or allocated and orphaned memory fragments. Examples of reclaimable memory objects include objects belonging to terminating processes, memory leakage, and underutilized or lower priority objects, such as may be allocated to a low-demand socket. CBM 130 can re-allocate reclaimed memory for use by other processes, as may be needed, for example, by an SCB, by a process buffer, or by a reserve buffer. Further, CBM 130 may re-allocate unused memory objects originally allocated to processes lower in the communication stack, for re-allocation as buffers, including transmit reserve buffers, receive reserve buffers, or both.

Reserve buffers RR 127 and RT 129 may be allocated by CBM 130 to SCB 125 during socket Si creation. Despite being allocated, CBM 130 may cause Si to defer storing messages in reserve buffers RR 127 and RT 129, until detecting the existence of a predetermined operational state. Thus, reserve buffers RR 127 and RT 129 may remain allocated and free before the existence of a predetermined operational state. However, it may not be desirable to reclaim an allocated and free reserve buffer, despite the predetermined operational state, for example, before the communications through the respective socket are terminated.

Desirably, the predetermined operational state can be represented by unallocated and reclaimable memory diminishing below predetermined free memory level L. When CBM 130 detects the existence of the predetermined operational state in communication buffer 118, CBM 130 can begin to augment communications using process buffers 126, 128 with the associated reserve buffers RR 127 and RT 129. Although reserve buffers RR 127 and RT 129 may represent memory objects allocated to SCB 125 during its creation, they also may represent memory objects later added by CBM 130 by supplemental allocation during operations, or by reclamation and re-allocation. Such reserve buffers 127, 129 may be advantageous, to prevent, or to ameliorate, buffer deadlock or starvation states, which may arise, for example, when LPROC #1 120 may transfer a large volume of messages to transmit process buffer 128, substantially concurrently with receive process buffer 126 accepting a large volume of messages transferred from REMHOST 110. Also, LPROC #1 120 may be configured to defer performing a BUFFER READ operation from receive process buffer 126, until after completing an in-progress BUFFER WRITE operation to buffer 128. With transmit process buffer 128 accepting messages from LPROC #1 120, in addition to retaining copies of messages being transferred to REMHOST 110, the available memory space in communication buffer 118 may begin to diminish. When a predetermined operational state exists in communication buffer 128, the embodiments described herein may provide sufficient reserve memory to potentially avert buffer deadlock or buffer starvation.

Conveniently, if so configured, CBM 130 may adaptively filter the messages being transmitted through reserve buffers RR 127 and RT 129, such that preselected messages can be stored therein and communicated therethrough. For example, as the amount of free memory in buffer 118 diminishes below level L and the number of reserve buffers RR 127 and RT 129 available for use also become constrained, it may be desirable to limit communication through reserve buffers RR 127 and RT 129 to fundamental control messages, such as an ACK.

Reserve buffers RR 127 and RT 129 may provide a process (e.g., LPROC #1 120) with enough memory to permit a BUFFER WRITE operation to complete, to transmit an ACK to REMHOST 110, and so on.

Figure 2:
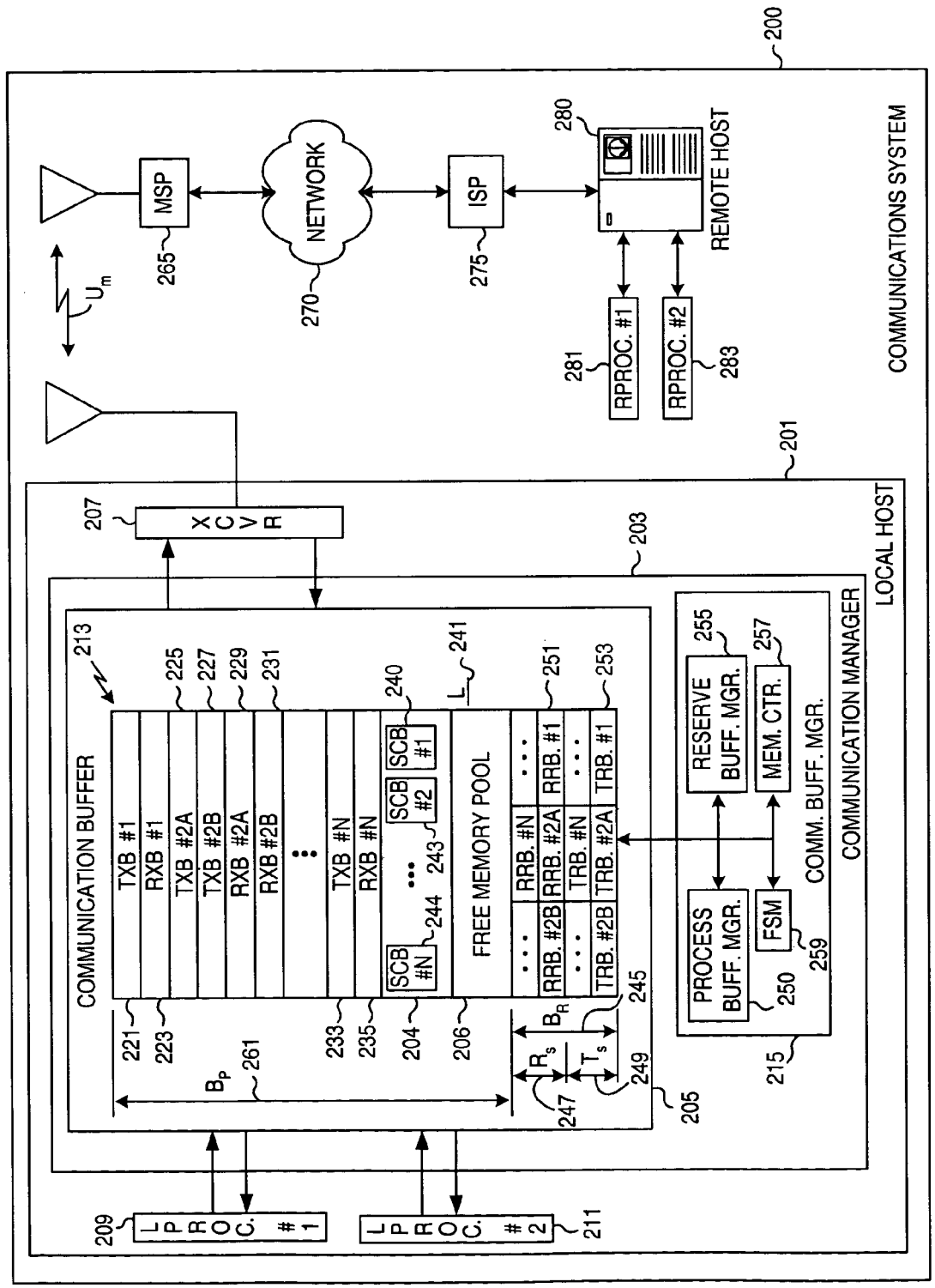
FIG. 2 is a simplified schematic block diagram of another embodiment of a communication buffer manager disposed in a local host.

In communication system 200 of FIG. 2, local host (LHOST) 201 employs communication manager 203 to communicate messages to remote host (REMHOST) 280, across communication network 270. Typically, each host executes at least one communications process to exchange messages with another host. In FIG. 2, messages can be exchanged between LHOST 201 and REMHOST 280 by creating a link across network 270 between first local communications process (LPROC #1) 209 and first remote communication process (RPROC #1) 281. Where LHOST 201 subsumes a mobile wireless device, LHOST 201 can include transceiver (XCVR) 207, which may be configured to communicate messages across the physical air (Um) interface with mobile service provider (MSP) 265. It may be desirable that communications implement a predetermined full-duplex wireless communication protocol, using bidirectional communication links, although other communication protocols also may be employed. It may be useful to provide additional links for message exchange, across network 270, by executing second local communications process (LPROC #2) 211 in LHOST 201, second remote communication process (RPROC #2) 283 in REMHOST 280, or both. REMHOST 280 may communicate with network 270 by way of network gateway 275. At least a portion of network 270 may include a public packet switched network, such as the Internet.

Conveniently, LHOST 201 and REMHOST 280 can use a reliable, end-to-end network transport protocol to transfer messages therebetween substantially intact, in order, and in a timely manner. To the extent a message may be missing, damaged, lost, or excessively delayed, during communication between LHOST 201 and REMHOST 280, LPROC #1 209 and RPROC #1 281 may employ reciprocal reliable transport services to provide for message retransmission. Although exemplary transport protocols cooperate with exemplary wireless communication protocols, it may be desirable that LHOST 201 include communication buffer 205, to compensate for differences in message rate and message flow in the communication links with REMHOST 280.

Advantageously, communication buffers can be provided at each host 201, 280, to facilitate reliable communication transport. Communication buffers, formed from multiple memory objects, can be disposed into discrete physical or logical subunits, such as for one or more transmit buffers, receive buffers, or both. Alternatively, a communication buffer also can be disposed as a single, global memory pool, from which memory objects may be allocated to satisfy current communication needs. In general, a memory object disposed to receive information, such as a message, can be designated as free memory. Functionally, a memory object in free memory can be considered to be write-enabled. On the other hand, memory objects temporarily storing information, may be designated as committed memory. Functionally, a memory object designated as committed memory can be considered to be temporarily write-inhibited, in order to preserve the logical contents therein. When it may no longer be desired to preserve those contents, a committed memory object then may be designated as free memory, functionally able to receive new data (i.e., be write-enabled).

TCP/IP is among the exemplary reliable, end-to-end network transport protocols, which may be used to communicate between LHOST 201 and REMHOST 280. When communications between LHOST 201 and REMHOST 280 is desired, one or more communication links may be established for each communication process, in each direction of communication between local process 209 and remote process 281. As such a link is established, one or more communication link interfaces may be created for each transport protocol endpoint, or access point, associated with the communicating processes (e.g., LPROC #1 209 and RPROC #1 281). Typically, each computer communicating on a network can be assigned a logical identifier, for an example, an IP address. Similarly, a logical identifier, which may be a port number, can be assigned to an access point on a respective computer for a communication process running on a network. Together, the computer identifier and the port number may be arranged to identify the access point, or socket, by which a communicating process on a local host may communicate messages with a communicating process on a remote host.

In general, TCP/IP messages can be formed of a header and data payload. Beneficially, the arranged identifier which may be representative of a socket (e.g., [<IP address><port number>]) can be included within a TCP/IP message header, thereby assisting in reliable message transport by identifying communication source and destination endpoints. In a TCP-type implementation, a message can be analogous to a TCP segment, and a process buffer can be analogous to one or more socket buffers. Whether buffers are allocated as a fixed number of memory locations, or are allocated relative to process memory demands, communication buffer manager apparatus and methods, such as those described and claimed herein, may be advantageous to obviate the unfairness that can result, especially in embedded environments, where the total amount of available memory may be constrained.

In exemplary LHOST 201, communication manager 203 can include communication buffer 205 and communication buffer manager 215. Communication buffer manager 215 can be adapted to allocate memory objects in communication buffer 205, responsive to LPROC #1 209 and LPROC #2 211. Process buffers can be allocated to facilitate the communications functions of LPROC #1 209, LPROC #2 211. In certain embodiments, communication buffer 205 may be provided as global memory pool 213. Memory objects in global memory pool 213 can include both committed memory portion 204, and free memory pool 206. Where desired, buffer manager 215 may designate memory objects as free memory or as committed memory. Memory object allocation can include selecting the size, the quantity, and the purpose of allocated buffers responsive to communication link negotiation parameters, or to the current operational or communication needs of communication manager 203.

Typically, as a communications link is established, a respective TCP socket can be created on either end. For example, a socket Si can be created in LHOST 201 for LPROC #1 209, with a socket being created in REMHOST 280 for RPROC #1 281. Socket, Si, can be represented by memory objects such as a socket control block (SCB), a transmit process buffer (TXB), and a receive process buffer (RXB). An exemplary SCB may be SCB #1 240, an exemplary TXB may be TXB #1 221, and an exemplary RXB may be RXB #1 223. In general, at least one TXB may be allocated to an SCB to service a local process transmit function, and at least one RXB may be allocated to an SCB to service a local process receive function, although more TXB, more RXB or both may be allocated. For example, LPROC #1 209 can employ SCB #1 240, to which may be allocated TXB #1 221 to transmit messages to RPROC #1 281, and RXB #1 223 to receive messages from RPROC #1 281. LPROC #2 209 may employ SCB #2 243, to which may be allocated TXB #2A 225, TXB #2B 227, RXB #2A 229, and RXB #2B 231, to communicate with another remote access point in REM- HOST 280, such as may be in RPROC #1 281 or in RPROC #2 283. After initially being allocated from unallocated free memory pool 206, memory objects SCB #1 240, TXB #1 221, RXB #1 223 can be designated as allocated free memory or allocated committed memory. A process buffer may be allocated after socket creation, for example, on an as-needed basis; and may selectively be allocated as RXB, as TXB, and in a combination thereof.

It is contemplated herein that reserve buffers be allocated during socket Si creation, and additional reserve buffers may later be allocated to socket Si or be allocated after socket Si creation, for example, on an as-needed basis. It also is contemplated that reserve buffers may not be allocated during socket Si creation, but be allocated afterwards, responsive to the needs of the communication process with which socket Si may be associated. Although a single reserve buffer may be allocated to SCB #i, it may be advantageous to allocate to SCB #i a transmit reserve buffer (TRB) and a reserve receive buffer (RRB). Also, it may be desirable to associate a TRB for use with a respective TXB, and an RRB for use with a respective RXB.

As with process buffers, the size, number, and type of reserve buffers may be adapted to suit the nature of intended communications. A reserve buffer may be sized to permit selected communications to be conducted between hosts LHOST 201 and REMHOST 280, thereby minimizing the likelihood of deadlock or buffer starvation. Desirably, the selected communications include communicating messages at a preselected communication rate. However, the selected communications may be control messages, including an ACK, to be exchanged between LHOST 201 and REMHOST 280.

In one example of reserve buffer embodiments herein, socket S1 can be created when exemplary SCB #1 240 is instantiated, and when exemplary process buffers TXB #1 221 and RXB #1 223 are allocated for transmit and receive communications operations, respectively, from, global memory pool 213. Methods and apparatus which may be used to instantiate socket control blocks, and to allocate buffers, are well-known in the computer and communications arts, and also may be used herein. In certain embodiments, socket control blocks may be instantiated and process buffers allocated with the cooperation of global memory pool 213, with process buffer manager 250 and, perhaps, finite state machine or state controller 259.

Substantially concurrently with the creation of socket S1, TRB #1 253 can be allocated and reserved for transmit operations by S1; and RRB #1 251 can be allocated and reserved for receive operations by S1. Multiple reserve buffers may be allocated to an Si, such as S1, for transmit operations, receive operations, or both. In another example, where an UDP-type transport protocol may be used, socket S2 can be associated with SCB #2 243. A nominal maximum size of an UDP datagram may be n buffers. Thus, it may be desirable to allocate n TRB from global memory pool 213 to UDP socket S2, as well as n RRB, where $1 \leq n \leq N$.

Further, it may be desirable to designate a logically distinct reserve buffer space BR 245, within global memory pool 213, from which reserve buffers may be allocated. Reserve buffer space BR 245 can be configured so that an adequate number of reserve buffers may be allocated for the sockets Si of an anticipated number and type of communication processes, which may overlap during execution. Moreover, transmit reserve buffer pool TS 249 and reserve receive buffer pool Rs 247 may be constituents of BR 245. Transmit reserve buffer pool TS 249, can serve as a source from which TRBs (generally at 253) can be allocated and reserved. Similarly, reserve receive buffer pool Rs 247, can serve as a source from which RRBs (generally at 251) can be allocated and reserved. Socket Si creation may be aborted if a predetermined minimum number of reserve buffers are unable to be allocated, with a perceivable message indicative of the failure being provided.

Although reserve buffers may be allocated at the time of socket creation, it may be advantageous not to use reserve buffers for communications until a predetermined operational state is reached. An exemplary, non-limiting predetermined operational state can include a predetermined memory state. The predetermined memory state may exist when the remaining memory in free memory pool 206 diminishes to a preselected free memory value, L, 241. Where communication buffer manager 215 can be so configured, active sockets Si may be configured to be responsive to dynamic memory allocation, in which one or more active sockets Si corresponding to LPROC #1 209, LPROC #2 211, and other active local processes, may allocate, reclaim, free, commit, and share among themselves, process buffers TXB #1 221, TXB #2A 225, TXB #2B 227, TXB #N 233; RXB #1 223, RXB #2A 229, RXB #2B 231, and RXB #N 235; and other process buffers which may be created within global memory pool 213. Allocation of available memory objects may be performed continuously, or on an as-needed basis.

Prior to the occurrence of the predetermined operational state, both transmit buffers and receive buffers may be openly allocated from any portion of process buffer space BP, 245. Upon the occurrence of the predetermined operational state, it may be desirable to allocate transmit buffers only from transmit reserve buffer space TS 249; and to allocate receive buffers only from reserve receive buffer space RS 247. As with process buffers, reserve buffers can be unallocated or allocated. Unallocated reserve buffers can be memory objects which generally may be ready for allocation to a process. Allocated reserve buffers are memory objects, which may be designated as free or committed. A free allocated reserve buffer can be in a condition ready to receive a message, whereas a committed reserve buffer can store a message related to the process to which it is allocated, and temporarily may inhibit a new message from being stored therein. After a committed reserve buffer is designated as a free reserve buffer, however, it may be reclaimed and returned to unallocated free memory for re-allocation, if the memory management strategies implemented in communication buffer manager are so adapted.

Efficient memory management of reserve buffer space BR 245 can be accomplished by monitoring whether a particular reserve buffer (generally at 251, 253) may be in use, and by returning reserve buffers, which may be underutilized or no longer in use, to a selected reserve buffer pool from which it originally was allocated, such as RS 247 and TS 249. Also, buffers originally in the lower layers of the protocol stack associated with a particular socket, which may be underutilized or no longer in use, may be reassigned to a selected reserve buffer pool. Upon exhaustion of the reserve buffers associated with a selected reserve buffer pool, and substantially concurrently with the predetermined operational state, a selected memory management procedure may be performed.

For example, a predetermined operational state may exist when the number of available memory objects in global memory pool 203 is reduced below about memory level L 241. Advantageously, local processes, such as LPROC #1 209 and LPROC #2 211, may cooperatively allocate among themselves process buffers TXB #1 221, TXB #2A 225, TXB #2B 227, TXB #N 233; RXB #1 223, RXB #2A 229, RXB #2B 231, and RXB #N 235; as well as other process buffers which may be associated therewith. As new sockets Si are created, receive reserve buffers (e.g., generally at RRB #1 251) and transmit reserve buffers (e.g., generally at TRB #1 253) may be allocated within the free memory range of reserve buffer space BR, 245. However, in applications so configured, reserve buffers, RRB #1 251 and TRB #1 253, may not be employed until the predetermined operational state exists.

When the number of available memory objects in unallocated free memory pool 206 is diminished to predetermined memory level, L 241, local processes, such as LPROC #1, LPROC #2, may use transmit and receive reserve buffers, e.g., RRB #1 251 and TRB #1 253, allocated to associated sockets Si, particularly when one or more of associated process buffers, e.g., TXB #1 221, RXB #1 223, otherwise would transition to an undesirable condition such as buffer starvation or deadlock.

When a socket Si is created after the existence of the predetermined operational state, associated transmit process buffers and socket control block may be allocated from remaining free memory in memory pool 206. Also, it may be desirable to allocate transmit reserve buffers (gen. at TRB #1 253) from available buffers in transmit reserve pool, TS 249. When so configured, buffers originally in the lower layers of a protocol stack and associated with a particular socket SX, which may be underutilized or no longer in use, instead may be associated with transmit reserve pool, TS 249. When available buffers are exhausted in transmit reserve pool, TS 249, a selected memory management procedure can be performed, such as blocking additional transmit operations.

Relative to receive functions upon the occurrence of the predetermined operational state, it would be desirable to draw receive reserve buffers (generally at RRB #1 251), from available buffers in receive reserve pool, RS 247. Also, those committed receive reserve buffers, no longer in use, may be designated as free receive reserve buffers, returned to reserve receive pool, RS 247, and subsequently used by later-incoming messages. When available buffers are exhausted in reserve receive pool, RS 247, a selected memory management procedure can be performed, such as causing socket Si to dump, or not accept, presently received messages.

Where so configured, communications buffer manager 215 can implement cooperative memory allocation of process buffers in communication buffer 205 via process buffer manager 250. In addition, memory allocation of reserve buffers in reserve buffer space BR, 245, can be effected by reserve buffer manager 255. Memory allocation for process buffers, reserve buffers, or both, may employ static or dynamic memory management techniques. Communications buffer manager 215 may be adapted to effect static or dynamic process buffer management using process buffer manager 250. Similarly, communications buffer manager 215 also may be adapted to effect static or dynamic reserve buffer management using reserve buffer manager 255. It may be desirable to cooperatively employ memory counter 257 and finite state machine 259, or functional equivalents thereof, to facilitate memory allocation and response to the predetermined operational state. In static memory allocation, a predetermined quantity of process buffers, each having a predetermined buffer size, can be preestablished for allocation to a socket control block, regardless of the communication requirements of socket Si. In one example of static memory allocation, a single value may be preestablished for the predetermined buffer size for each of process buffer TXB #1 221, TXB #2A 225, TXB #2B 227, TXN #N 233, RXB #1 223, RXB #2A 229, RXB #2B 231, and RXB #N 235. Also, a predetermined process buffer quantity may be preestablished for each socket Si. However, static memory allocation may be influenced by the communication purpose of socket Si, such that one or both of the predetermined process buffer quantity and the predetermined buffer size may be preestablished in response to the purpose and, thus, anticipated communication needs of a particular socket type. Typically, statically-allocated process buffers, once allocated, tend to remain substantially unchanged throughout the lifespan of socket Si.

In dynamic memory allocation, communications buffer manager 215 initially may allocate to socket Si, selected ones of process buffers TXB #1 221, TXB #2A 225, TXB #2B 227, TXN #N 233, RXB #1 223, RXB #2A 229, RXB #2B 231, and RXB #N 235. Desirably, during the creation of socket Si, communications buffer manager 215, may select the size and number of process buffers provided in response to anticipated communication needs, the intended communication purpose of socket Si, or other predetermined eing factor, or combination thereof. During execution of processes LPROC #1 209, LPROC #2 211, or both, communication buffer manager 215 may respond to the present communication needs of socket Si by changing the predetermined process buffer quantity, the predetermined process buffer size, or both, which may be allocated to socket Si. Such responsiveness can be facilitated by process buffer manager 250.

In one example of dynamic memory allocation, also as illustrated in FIG. 2, LPROC #1 209 may be allocated TXB #1 221, and RXB #1 223. In an instance where LPROC #2 211 initially employs more buffers than LPROC #1 209, communications buffer manager 215 may allocate transmit buffers TXB #2A 225, TXB #2B 227, for the transmit communications functions associated with LPROC #2 211, as well as RXB #2A 229 and RXB #2B 231, for the receive communications functions of LPROC #2 211. Additional process buffers, such as TXB #N 233 and RXB #N 235, may be allocated to LPROC #1 209, in response to communication functions of LPROC #1 209, after memory for LPROC #2 211 is allocated.

Figure 3A:
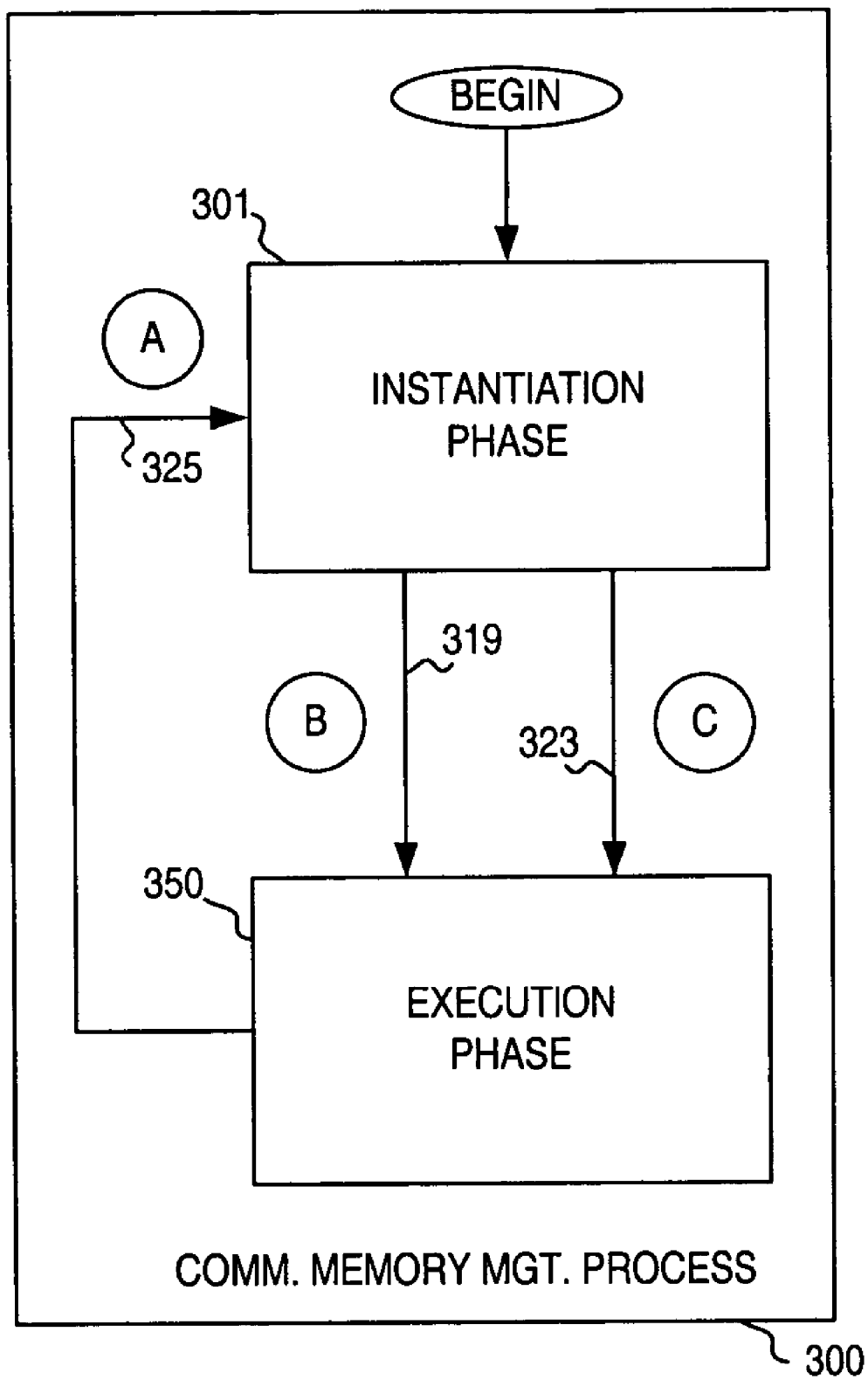
FIG. 3A is a simplified schematic block diagram of a communication buffer memory management process, including an INSTANTIATION PHASE and an EXECUTION PHASE, according to the present invention.

FIG. 3A illustrates an overview of a non-limiting exemplary communication buffer management method 300, according to the teachings of the present invention. Method 300 can be used to facilitate message communication between a local communication process in a local host and a remote communication process in a remote host. Each communication process typically employs a communication process interface, with the local communication process interface being linked across a communication network to the remote communication process interface. A communication process interface can facilitate message communication by employing a logical communication control data structure and at least one communication buffer. Common communication control data structures and communication buffers are well-known in the telecommunication and computer arts and may be represented by at least one, and usually multiple, data storage units, or memory objects.

In general, a local host communication buffer can be disposed as a global memory pool from which memory objects can be disposed into process buffers, reserve buffers, logical communication control data structures, and the like. A process buffer can be associated with, and used by, a particular control structure, to effect typical message communications. Conveniently, a control structure may be associated with a transmit process buffer and a receive process buffer. A reserve buffer can be associated with, and used by, a particular control structure, to effect selected communications in response to a predetermined operational state. A control structure may be provided a transmit reserve buffer and a receive reserve buffer. Although the aforementioned control structures and buffers can be created and disposed together within the global memory pool, a portion of the global memory pool may be disposed as a reserved buffer space, BR, from which the communication reserve buffers may be allocated. In addition, it may be desirable to further dispose space BR into a transmit reserve buffer space TS and receive reserve buffer space RS. A memory object can be designated as free memory or as committed memory. Free memory can be read or written, and can be available for new data to be stored therein. Committed memory can be read but also may be write-inhibited, by which the data already therein may temporarily be preserved. Typically, a buffer that is used by an existing process to communicate messages can be designated as committed memory.

Figure 3B:
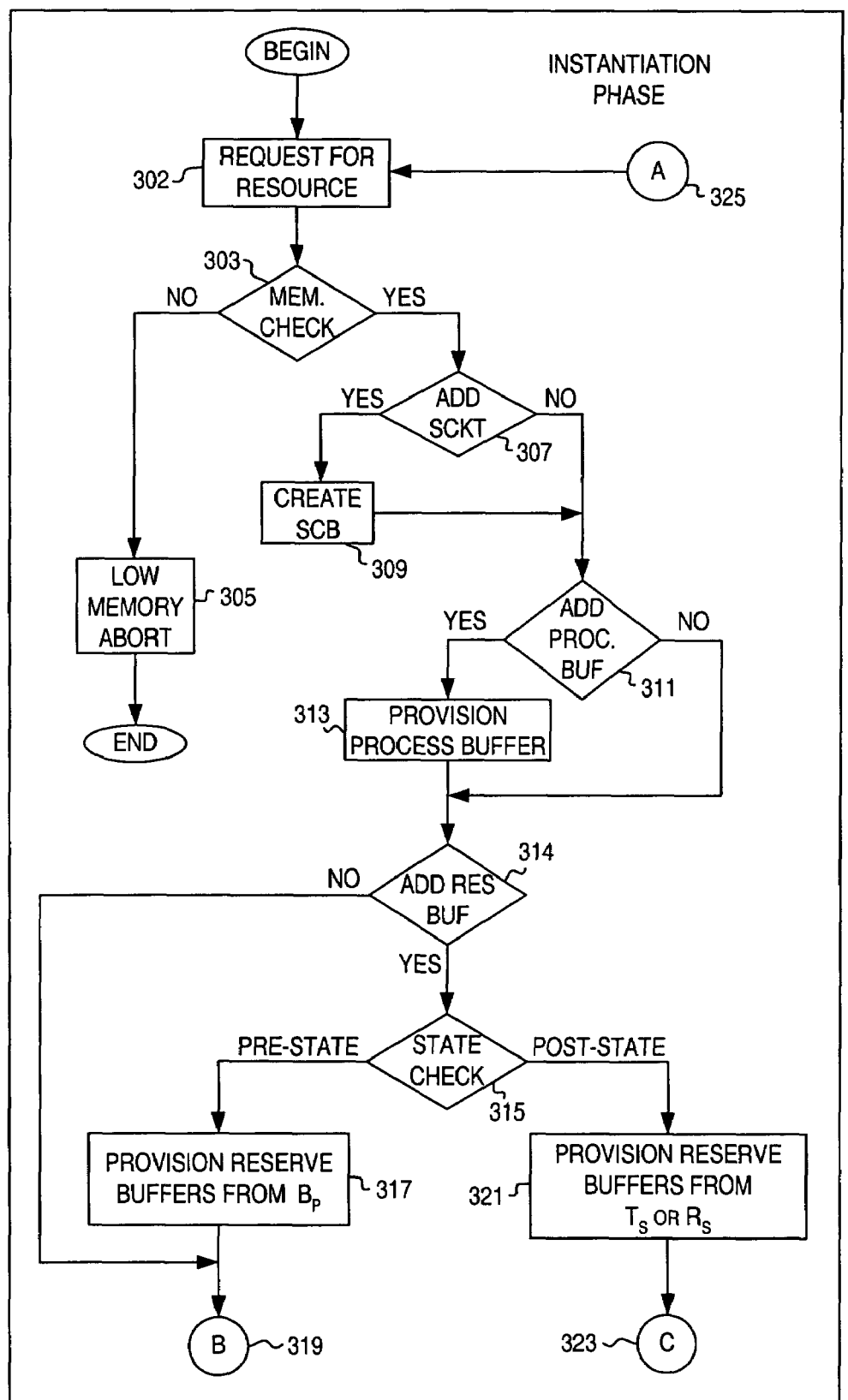
FIG. 3B is a simplified schematic block diagram of an INSTANTIATION PHASE of the embodiment shown in FIG. 3A.

For the purposes of exposition, management method 300 in FIG. 3A comprehends INSTANTIATION PHASE 301 cooperating with EXECUTION PHASE 350. FIG. 3B can be an exemplary illustration of INSTANTIATION PHASE 301, and FIG. 3C can be an exemplary illustration of EXECUTION PHASE 350. Where process 300 and phases 301, 350 are so configured, one or more local communication processes may request and receive additional resources, including sockets, process buffers, and reserve buffers. Advantageously, a variety of memory management policies may be implemented to efficiently control the use of resources during communications operations. One exemplary policy can be a first-come, first serve basis memory management policy, and another policy can be an as-needed basis memory management policy. However, it also may be desirable to assign in advance, a fixed amount of resources to each communication process, or a fixed amount of resources responsive to the type of process making the request. Resources allocated during INSTANTIATION PHASE 301 may be reclaimed, when appropriate, during EXECUTION PHASE 350, and made available for reallocation or remapping during a subsequent instantiation of resources. It is contemplated that the embodiments herein not be limited by the memory management and reclamation policies and techniques employed, but rather enhanced thereby.

Continuing in FIG. 3A, during exemplary INSTANTIATION PHASE 301, a communication process interface, such as a socket, may be instantiated by creating an associated a communication process control structure, such as a socket control block (SCB). In addition, one or more communication process buffers may be allocated for use by the respective SCB in controlling message flow for the respective communication process. In inventive embodiments herein, one or more communication reserve buffers also can be allocated for, and associated with, a SCB. During exemplary EXECUTION PHASE 350, the SCB and associated communication process buffers can be used to carry out routine message communication between the local communication process and the remote communication process over a communication network link. Advantageously, reserve buffers may permit a predetermined minimum communication to continue between a local communication process and a corresponding remote communication process, even where free memory may be sufficiently exhausted to otherwise produce a state of buffer starvation or a state of buffer deadlock.

Execution phase 350 can interact with INSTANTIATION PHASE 301, such as through process path A 325, process path B 319 and process path 323. Through process path A 325, a communication process operating in EXECUTION PHASE 350 may request that additional SCB be created, as needed, or, if so configured, that additional process or reserve buffers be allocated to an existing SCB. Similarly, through process paths B 319 and C 323, INSTANTIATION PHASE 301 may provide EXECUTION PHASE 350 with multiple modes of operation. For example, INSTANTIATION PHASE 301 can cooperate with EXECUTION PHASE 350 by directing process 300 to selected process path B 319 or process path C 323, in response to a predetermined operational state. The predetermined operational state may be a predetermined memory state. Also, EXECUTION PHASE 350 also may perform selected memory reclamation functions. In a typical memory reclamation function, memory locations associated with inactive resources may be returned to a global memory pool for re-use.

Instantiation phase 301 in FIG. 3B can begin with an incoming request for resources (Operation 302), for example, from a local communication process. The resource requested can be a new communication socket or, if so configured, for additional resources to be used with an existing communication socket. Communication buffer memory can be analyzed to determine whether sufficient memory may be available to fulfill the incoming resource request (Op. 303). When free, unallocated memory may be insufficient to create a requested resource, creation can be aborted (Op. 305), with an appropriate perceptible message.

Otherwise, if a socket resource is requested (Op. 307), an SCB can be created (Op. 309). Similarly, if the requested resource includes a process buffer (Op. 311), then a process buffer can be allocated from memory pool BP (Op. 313). It may be desirable that socket creation include, for example, SCB creation (Op. 307), as well as allocation of one of more associated process buffers (Op. 313). However, it may not be required that a process buffer be allocated at the time a socket is created, and a process buffer may be allocated at a later time, as needed. A buffer resource request by a communicating process may include a request for one or more reserve buffers (Op. 314).

In certain embodiments, it may be desirable to customarily allocate a reserve buffer during Op. 313, in conjunction with allocation of a process buffer. However, such is not required, and it can be advantageous to allocate a reserve buffer, in response to a predetermined operational state (Op. 315). Such a predetermined operational state may be a predetermined memory state, for example, when the number of available free memory locations in process buffer memory pool BP falls below about level L. In general, using the latter approach, both transmit and receive reserve buffers may be allocated from process buffer memory pool BP (Op. 317), prior to the existence of the predetermined operational state (PRE-STATE). After the predetermined state exists (POST-STATE), it may be desirable instead to allocate reserve buffers from reserve buffer pool, BR (Op. 321). It also may be beneficial to create transmit reserve buffers from transmit reserve buffer memory pool portion TS, and to create receive reserve buffers from receive reserve buffer memory pool portion RS. Transmit reserve buffer memory pool portion TS, and reserve buffer memory pool portion RS may be constituent portions of reserve buffer pool, BR.

Figure 3C:
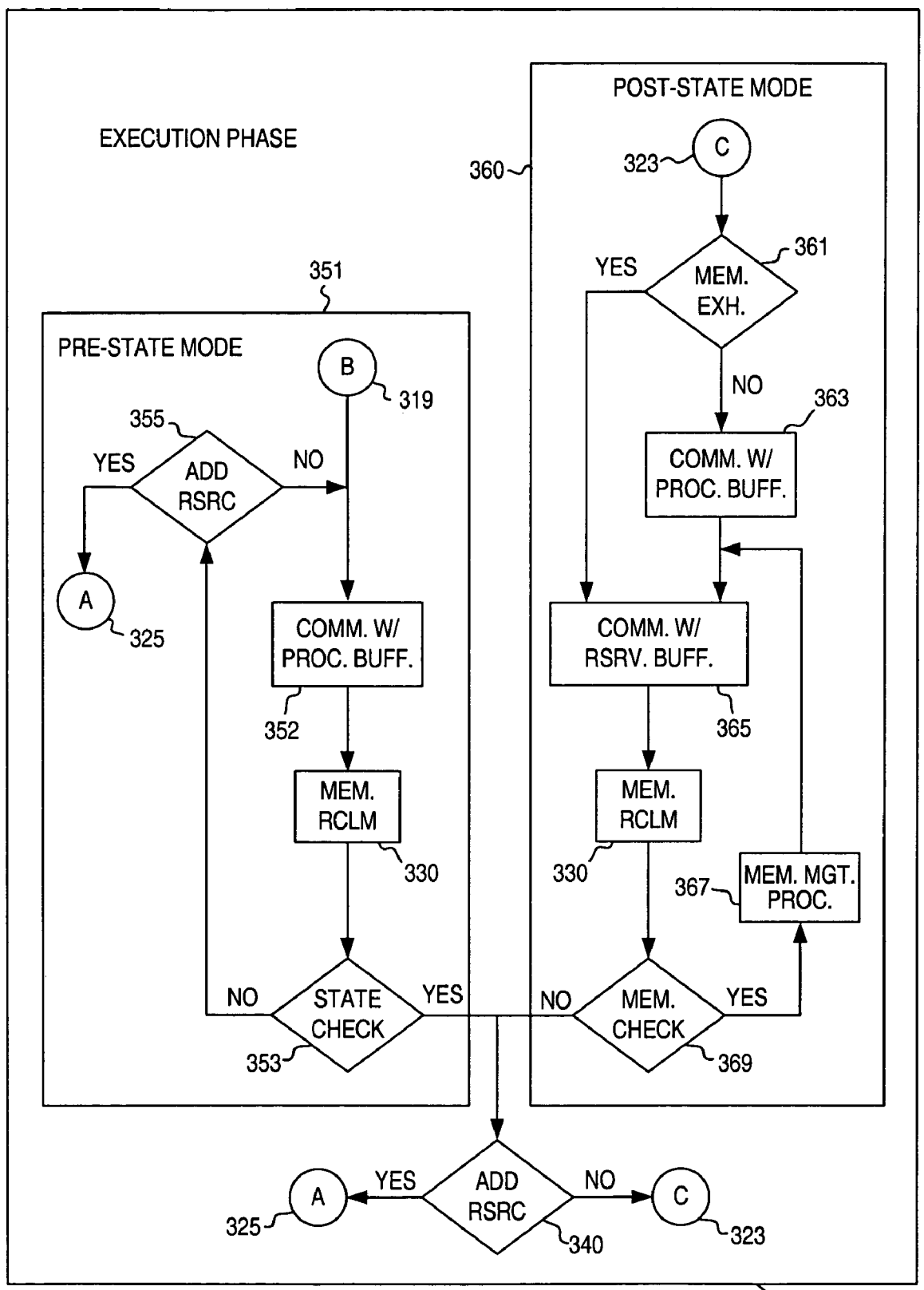
FIG. 3C is a simplified schematic block diagram of an EXECUTION PHASE of the embodiment shown in FIG. 3A.

As indicated above with respect to FIG. 3A, EXECUTION PHASE 302 may have multiple modes of operation. With respect to FIG. 3B, a first mode of operation, following process path B 319, may be selected when in a PRE-STATE condition; while a second mode of operation, following process path C 323, may be selected when in a POST-STATE condition. Although alternative or additional modes of operation may be used in conjunction with the embodiments herein, for clarity, two non-limiting, exemplary modes of operation for EXECUTION PHASE 350 are illustrated in FIG. 3C: PRE-STATE operating mode 351 and POST-STATE operating mode 360. In keeping with previous examples, the flow of communication memory management process 300 may follow process path B 319 into PRE-STATE operating mode 351, when the number of free memory locations may be greater than or equal to about level L. Similarly, the flow of communication memory management process 300 may follow process path C 323 into POST-STATE operating mode 360, when the number of free memory locations may be less than about level L.

In an exemplary PRE-STATE operating mode 351, messages may be communicated between a respective local socket, including SCB and process buffers, in a local communication process in the local host, and a remote socket in remote communication process in the remote host, during which communication memory may be monitored (Op. 352). During Op. 352, messages may be communicated using message communication protocols including, without limitation, the well-known TCP and UDP transport protocols. At the end of a communication, a socket may be closed and its associated resources may become idle or unused. Advantageously, PRE-STATE mode 351 can include memory reclamation (Op. 330), by which committed memory associated with a closed socket may be designated as free memory and returned to the free memory pool for re-use.

Also, selected committed memory may be designated as free memory based upon a memory allocation policy implemented within Op. 330. For example, it may be desirable to implement a memory allocation policy wherein an infrequently used buffer, initially committed to a first process having a first priority, is reallocated, and committed to, a second process having a second priority, and wherein the second priority is higher than the first priority. As communication processes continue during PRE-STATE mode 351, potentially leading to fluctuations in the available amount of free memory, it may desirable to determine whether a predetermined operational state has occurred (Op. 353). If EXECUTION PHASE 350 has not entered the POST-STATE condition, it may be desirable to determine whether additional resources are requested by local communication processes (Op. 355). When the predetermined operational state does not exist, it may be desirable to determine whether additional resources are requested (Op. 333). If so, such a resource request may transmitted to INSTANTIATION PHASE 301 (e.g., FIG. 3B), via process path A 325. If not, then communication process memory monitoring may continue (Op. 352), as messages are communicated via a respective local socket to a remote socket.

When a POST-STATE condition does exist (Op. 353), it also may be desirable to determine whether additional resources are desired (Op. 340) including, for example, an additional socket or an additional buffer, or both. When additional resources are requested, such as an additional socket, or if so configured, one or more additional buffers, such request may be to INSTANTIATION PHASE 301 (FIG. 3B) via process path A 325. On the other hand, when additional resources are not requested following the occurrence of a POST-STATE condition, EXECUTION PHASE 350 operation may proceed via process path C 323, that is, enter POST-STATE operational mode 350.

In POST-STATE mode 360, it may be desirable to determine whether the free memory within a respective process buffer has been exhausted (Op. 361). For example, a respective receive process buffer may be full after a burst of messages have been received yet before the process buffer has been read. Of course, free memory within a process buffer can be distinct from free memory in either process buffer pool $B_P$ or reserve buffer pool $B_R$, in that process buffer free memory typically can be created from process buffer pool $B_P$ and allocated to a respective socket. A process buffer can include free and committed memory locations therein, responsive to the memory requirements of the communication process associated with the respective socket. When process buffer free memory may substantially be exhausted, deadlock—or another undesirable communication state—may be averted by employing the reserve buffers associated with the respective socket (Op. 365), thereby allowing communications to proceed. It may be desirable to limit communications between the local host and the remote host to flow control messages, status messages, and the like, which can be useful to forestall, if not prevent communication faults due to buffer starvation, buffer deadlock, and other constrained buffer communication states.

When the respective process buffer possesses sufficient free memory, however, messages may be communicated using available buffer memory between a respective local socket, including SCB and process buffers, in a local communication process in the local host, and a remote socket in remote communication process in the remote host (Op. 363). In Op. 363, messages may be communicated using message communication protocols including, without limitation, the well-known TCP and UDP transport protocols. In supplement to the process buffers facilitating message communication in Op. 363, respective communication reserve buffers also can be employed by the associated socket (Op. 365). Advantageously, as in PRE-STATE mode 351, POST-STATE mode 360 may employ memory reclamation (Op. 330), which can include releasing committed memory allocated to, for example, a transmit reserve buffer back to memory pool $T_S$, a receive reserve buffer back to memory pool $R_S$, and a process buffer back to the free memory pool $B_P$. Also, memory reclamation (Op. 330) in POST-STATE mode 350 can include making available for re-use, memory locations originally allocated to a lower protocol layer, but presently not in use. Although it may be advantageous to include such reclaimed memory in transmit reserve buffer pool $T_S$, it also may be desirable to include part or all of such memory in receive reserve buffer memory pool $R_S$. Furthermore, all or part of such memory may be included in a free memory pool, such as memory pool $B_P$. Moreover, memory reclamation also may include re-allocating memory from a first process, buffer type, or both, to a second process, buffer type, or both, particularly when process 300 may be configured for dynamic memory allocation. For example, a transmit buffer of a first process may be re-allocated to be a receive buffer of a second process, and vice versa.

After memory reclamation (Op. 330), it may be desirable to determine whether sufficient memory is available to communicate messages in a selected process buffer (Op. 369). When the free memory of the selected process buffer may be nearly exhausted, it may be useful to execute a predetermined memory management procedure (Op. 367), in addition to memory reclamation (Op. 330). In an exemplary memory management procedure, when the selected process buffer is a receive process buffer, the predetermined memory management procedure may include $R_S$ pool buffer exchange, in which an incoming message can be placed in receive reserve buffer pool $R_S$, while a receive reserve buffer is being designated as free memory. Also, when receive reserve buffer memory may be insufficient to communicate additional messages, it may be convenient to drop received messages until sufficient memory can be recovered, for example, from a sockets closing at the end of a communication, from one or more process buffers being reallocated between processes, and so on. When the selected process buffer is a transmit process buffer, the predetermined memory management procedure may include blocking additional messages from being added to the transmit process buffer. When a receive process buffer, a transmit process buffer, or both, associated with a particular socket, may be nearly filled, it may be desirable to continue communicating selected messages, such as control messages (e.g., ACKs), using the respective reserve buffers (Op. 365).

Of course, a skilled artisan would realized that the structures described in FIGS. 1 and 2, as well as the operations implementing process 300 in FIGS. 3A, 3B, and 3C are expository and intended only to exemplify the inventive principles herein. Thus, the exemplary entities illustrated by FIGS. 1, 2, 3A, 3B, and 3C may be directly or indirectly realized, wholly or in part, in hardware, in software, or in an operable combination thereof; and can be an operable result of functions distributed throughout a MSM (e.g., MSM 112), a communication manager (e.g., communication manager 203, a local host (e.g., LHOST 102 or 201), or a communication system (e.g., communication system 100). Although the exemplary methods and apparatus herein are described within the context of the hierarchical, multilayer, TCP/IP transport/network layer protocol suite, they also may be used to provide message delivery between hosts employing other direct or indirect response-type communication protocols, including, without limitation, acknowledgement-based communication protocols.

Many substitutions, modifications, alterations and equivalents may now occur to, and be made by, those having ordinary skill in the art, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include, not only the combination of elements which are literally set forth but, all equivalent elements for performing substantially the same function in substantially the same way to obtain substantially the same result. The claims are thus to be understood to include what is specifically illustrated and described above, what is conceptually equivalent, and also what incorporates the invention.

What is claimed is:

1. A method for wirelessly communicating a message between a local host and a remote host having a remote host interface, comprising:
   allocating to a local host interface a communication, control data structure corresponding to the local host interface, the local host interface being disposed in the local host;
   allocating a process buffer to the communication control data structure for storing the message being communicated between the local host interface in the local host and the remote host interface in the remote host;
   allocating a reserve buffer to the communication control data structure,
     wherein the reserve buffer augments communications by the process buffer and stores the message being wirelessly communicated between the local host interface in the local host and the remote interface in the remote host responsive to a first predetermined operational state,
     wherein the process buffer and the reserve buffer are allocated from unallocated free memory objects disposed in a global memory pool,
     wherein the reserve buffer is configured to store only control messages in response to a second predetermined operational state; and
   storing the message in the communication control data structure;
     wherein unallocated free memory objects are memory objects which are not allocated and are write-enabled;
     wherein at least the local host is a mobile wireless communication device having limited memory resources;
     wherein the first predetermined operational state is a state where an amount of unallocated free memory is less than a predetermined memory limit;
     wherein the second predetermined operational state is a state where the process buffer exceeds a predetermined threshold.

2. The method of claim 1, further comprising allocating the communication control data structure from unallocated free memory objects disposed in a global memory pool, the communication control data structure, the process buffer, and the reserve buffer being designated as allocated memory objects thereafter.

3. The method of claim 2, further comprising:
   allocating unallocated free memory objects as multiple process buffers to the communication control data structure for storing the message; and
   designating selected ones of the multiple process buffers as transmit process buffers, configured to store a transmitted message.

4. The method of claim 3, further comprising:
   designating selected others of the multiple process buffers as receive process buffers, configured to store a received message.

5. The method of claim 4, further comprising:
   allocating unallocated free memory objects as multiple reserve buffers to the communication control data structure;
   designating selected ones of the multiple reserve buffers to be transmit reserve buffers; and
   associating transmit reserve buffers with respective transmit process buffers.

6. The method of claim 5, further comprising:
   designating selected others of the multiple reserve buffers to be receive reserve buffers based on the first predetermined operational state; and
   associating the receive reserve buffers with respective receive process buffers.

7. The method of claim 6, wherein the local host interface comprises a TCP socket, and the communication control data structure comprises a TCP socket control block.

8. The method of claim 7, further comprising managing allocated memory objects and unallocated memory objects disposed in the global memory using one of dynamic memory allocation, dynamic memory reclamation, and both dynamic memory allocation and dynamic memory reclamation, maximizing unallocated free memory represented by the unallocated memory objects.

9. The method of claim 6 wherein the first predetermined operational state is representative of unallocated free memory being less than a predetermined memory limit.

10. The method of claim 1, wherein the second predetermined operational state is representative of unallocated free memory being less than a predetermined memory limit.

11. A method for wirelessly communicating messages between a local host and a remote host having a remote host interface, the local host having unallocated free memory, the method comprising:
   allocating a TCP socket control block adapted to correspond to a local host socket;
   allocating multiple process buffers to the TCP socket control block for storing a message being wirelessly communicated between the socket in the local host and the remote host interface in the remote host;

allocating multiple reserve buffers to the TCP socket control block based on a first predetermined operational state,
  wherein the multiple reserve buffers augment communications by the multiple process buffers and store the message being wirelessly communicated between the socket in the local host and the remote host interface in the remote host;
designating a plurality of the multiple process buffers to be transmit process buffers,
  wherein the transmit process buffers store transmit messages wirelessly communicated from the local host socket to the remote host interface;
designating a plurality of the multiple process buffers that were not designated to be transmit process buffers to be receive process buffers,
  wherein the receive process buffers store receive messages wirelessly communicated from the remote host interface to the local host socket;
designating a plurality of the multiple reserve buffers to be transmit reserve buffers,
  wherein the transmit reserve buffers are configured to store transmit messages wirelessly communicated from the local host socket to the remote host interface in response to the first predetermined operational state;
  wherein one of the transmit reserve buffers is configured to store only control messages in response to a second predetermined operational state;
designating a plurality of the multiple reserve buffers that were not designated to be transmit reserve buffers to be receive reserve buffers,
  wherein the receive reserve buffers are configured to store received messages wirelessly communicated from the remote host interface to the local host socket in response to the first predetermined operational state;
associating the transmit reserve buffers with respective transmit process buffers; and
associating the receive reserve buffers with respective receive process buffers,
wherein the TCP socket control block, the process buffers, and the reserve buffers are allocated from unallocated free memory disposed in a global memory pool,
wherein the first predetermined operational state is a state where an amount of unallocated free memory is less than a predetermined memory limit;
wherein the second predetermined operational state is a state where the process buffer exceeds a predetermined threshold; and
storing the message in the TCP socket control block;
wherein unallocated free memory is memory which is not allocated and is write-enabled;
wherein at least the local host is a mobile wireless communication device having limited memory resources.

12. The method of claim 11, wherein the second predetermined operational state is representative of unallocated free memory being less than a predetermined memory limit.

13. A method for wirelessly communicating messages between a local host and a remote host having a remote host interface, comprising:
  allocating a communication control data structure from free memory of a communication buffer disposed in the local host,
    wherein the communication control data structure corresponds to a local host interface;
  allocating multiple process buffers to the communication control data structure; designating a plurality of the multiple process buffers to be transmit process buffers;
  designating a plurality of the multiple process buffers that were not designated to be transmit process buffers to be receive process buffers;
  allocating multiple reserve buffers to the communication control data structure,
    wherein the multiple reserve buffers augment communications by the multiple process buffers; and
  designating a plurality of the multiple reserve buffers to be transmit reserve buffers;
  designating a plurality of the multiple reserve buffers that were not designated to be transmit reserve buffers to be receive reserve buffers,
    wherein the multiple process buffers and the multiple reserve buffers are allocated from unallocated free memory objects disposed in a global memory pool;
  wherein the multiple process buffers are each configured to store a message being wirelessly communicated between the local host interface in the local host and the a remote host interface in the remote host;
  wherein the receive process buffers store received messages from the remote host interface to the local host interface;
  wherein the transmit process buffers store transmitted messages from the local host interface to the remote host interface;
  wherein the reserve buffers each store a message for wirelessly communicating between the local host interface in the local host and the a remote host interface in the remote host, and
  wherein reserve buffers are configured to store messages responsive to a first predetermined memory state;
  wherein reserve buffers are configured to store only control messages in response to a second predetermined memory state;
  wherein unallocated free memory objects are memory objects which are not allocated and are write-enabled;
  wherein at least the local host is a mobile wireless communication device having limited memory resources;
  wherein the first predetermined operational state is a state where an amount of unallocated free memory is less than a predetermined memory limit;
  wherein the second predetermined operational state is a state where the process buffer exceeds a predetermined threshold.

14. The method of claim 13, further comprising:
  associating selected transmit reserve buffers with respective selected transmit process buffers; and
  associating selected receive reserve buffers with respective selected receive process buffers.

15. The method of claim 13, wherein the first predetermined memory state is representative of an amount of unallocated free memory being less than a predetermined memory limit.

16. The method of claim 13, wherein the second predetermined memory state is representative of unallocated free memory being less than a predetermined memory limit.

17. A method for wirelessly communicating messages between a local host and a remote host, the local host including a global memory pool, the method comprising:
  partitioning the global memory pool into a process buffer pool Be and a reserve buffer pool BR;
  receiving a request for creating a communication control structure;

responsive to the request for creating a communication control structure, creating from pool Bp a communication control data structure corresponding to a local host interface;

receiving a request for allocating a process buffer to the communication control structure;

responsive to the request for allocating a process buffer to the communication control structure, allocating a process buffer from pool Bp to the communication control data structure for storing a message being wirelessly communicated between the local host interface in the local host and the a remote host interface in the remote host;

receiving a request for allocating a reserve buffer to the communication control structure; and responsive to the request the request for allocating a reserve buffer to the communication control structure, allocating a reserve buffer to the communication control data structure, wherein the reserve buffer augments communications by the process buffer, wherein the process buffer and the reserve buffer is allocated from unallocated free memory objects disposed in the global memory pool, wherein the reserve buffer is allocated from one of pool Bp and pool BR responsive to a first predetermined memory state, and wherein the reserve buffer stores a message for wirelessly communicating between the local host interface in the local host and the remote host interface in the remote host, responsive to the first predetermined memory state;

wherein the reserve buffer is configured to store only control messages in response to a second predetermined memory state;

wherein unallocated free memory objects are memory objects which are not allocated and are write-enabled;

wherein at least the local host is a mobile wireless communication device having limited memory resources;

wherein the first predetermined operational state is a state where an amount of unallocated free memory is less than a predetermined memory limit;

wherein the second predetermined operational state is a state where the process buffer exceeds a predetermined threshold.

18. The method of claim 17, further comprising:
establishing a communication link across a communication network between the local host and the remote host having a remote host interface; and
one of:
  (a) storing a transmit message in a transmit process buffer before transmitting the transmit message to the remote host;
  (b) storing a receive message in a receive process buffer after receiving the receive message from the remote host
  (c) both of (a) and (b).

19. The method of claim 18, further comprising:
monitoring one of pool $B_P$ and pool $B_P$ in cooperation with a free memory pool for determining if the first predetermined memory state exists; and
if the first predetermined memory state exists, then one of:
  (a) storing a transmit message in a transmit reserve buffer before transmitting the transmit message to the remote host;
  (b) storing a receive message in a receive reserve buffer after receiving the receive message from the remote host; and
  (c) both of (a) and (b).

20. The method of claim 19, wherein pool $B_P$ comprises free memory locations, committed memory locations, and a combination thereof, and wherein the first predetermined memory state exists if free memory locations is less than a predetermined memory level, L.

21. The method of claim 20, wherein establishing the communication link across the communication network between the local host and the remote host further comprises establishing the communication link between the local host interface and the remote host interface using a predetermined transport-layer protocol.

22. The method of claim 21, wherein the local host interface comprises a socket, and the communication control data structure comprises a socket control block.

23. The method of claim 22, wherein at least a portion of the communication link comprises a physical air interface $U_m$, and establishing the communication link across the communication network between the local host and the remote host further comprises communicating across the portion using a predetermined wireless protocol.

24. The method of claim 17, wherein the second predetermined memory state is representative of unallocated free memory being less than a predetermined memory limit.

25. A method for wirelessly communicating messages between a local host and a remote host, the local host including a global memory pool, the method comprising:
partitioning the global memory pool into a process buffer pool Bp and a reserve buffer pool BR;
receiving a plurality of requests for creating communication control structures;
responsive to respective requests of the plurality of requests for creating communication control structures, creating from free memory of pool Bp respective communication control data structures corresponding to respective local host interfaces;
receiving a plurality of requests for allocating process buffers to one of the communication control structures;
responsive to respective requests of the plurality of requests for allocating process buffers to one of the communication control structures, allocating respective process buffers from free memory of pool Bp to the respective communication control data structures for storing messages being wirelessly communicated between the local host interface in the local host and the remote host interface in the remote host;
designating a plurality of the process buffers as transmit process buffers;
designating a plurality of the process buffers not designated as transmit process buffers as receive process buffers;
associating the plurality of designated transmit process buffers and the plurality of designated receive process buffers with respective communication control data structures;
receiving a plurality of requests for allocating reserve buffers to one of the communication control structures;
responsive to respective requests of the plurality of requests for allocating reserve buffers to one of the communication control structures, allocating respective reserve buffers to the communication control data structure,
  wherein the reserve buffers augment communications by the process buffers,
  wherein the process buffers and the reserve buffers are allocated from unallocated free memory objects disposed in the global memory pool, wherein the reserve buffers are allocated from one of pool Bp and pool BR responsive to a first predetermined memory state;

designating a plurality of the reserve buffers as transmit reserve buffers;

designating a plurality of the reserve buffers not designated as transmit reserve buffers as receive reserve buffers; and associating the designated plurality of transmit reserve buffers and the plurality of receive reserve buffers with respective communication control data structures;

wherein the transmit reserve buffers are configured to store only control messages in response to a second predetermined memory state;

wherein each of pool Bp and pool BR comprise free memory and committed memory, and wherein the reserve buffers store messages for wirelessly communicating between the local host interface in the local host and the remote host interface in the remote host, responsive to the first predetermined memory state;

wherein unallocated free memory objects are memory objects which are not allocated and are write-enabled;

wherein at least the local host is a mobile wireless communication device having limited memory resources;

wherein the first predetermined operational state is a state where an amount of unallocated free memory is less than a predetermined memory limit;

wherein the second predetermined operational state is a state where the process buffer exceeds a predetermined threshold.

26. The method of claim 25, further comprising associating selected transmit reserve buffers with respective transmit process buffers and selected receive reserve buffers with respective receive process buffers.

27. The method of claim 26, further comprising:
establishing a communication link across a communication network between the local host and the remote host having a remote host interface; and
one of:
(a) storing transmit messages in respective free memory transmit process buffers before transmitting the transmit messages to the remote host, the respective transmit process buffers being designated as committed memory transmit process buffers after the storing;
(b) storing receive messages in respective free memory receive process buffers after receiving the receive messages from the remote host, the respective receive process buffers being designated as committed memory receive process buffers after the storing; and
(c) both of (a) and (b).

28. The method of claim 27, and wherein the first predetermined memory state exists if free memory in pool $B_P$ is less than a predetermined memory level, L.

29. The method of claim 28, further comprising:
monitoring pool $B_P$ for determining if the first predetermined memory state exists; and
if the first predetermined memory state exists, then one of:
(a) storing transmit messages in respective transmit reserve buffers before transmitting the transmit messages to the remote host; and
(b) storing receive message in respective receive reserve buffers after receiving the receive message from the remote host; and
(c) both of (a) and (b).

30. The method of claim 29, further comprising:
associating selected transmit process buffers, selected transmit reserve buffers, selected receive process buffers, and selected receive reserve buffers with respective communication control data structures responsive to a selected memory management policy; and
in accordance with the selected memory management policy, effecting the associating by one of:
(a) designating ones of selected committed memory transmit process buffers as selected free memory transmit process buffers and associating the selected free memory transmit process buffers with free memory of pool $B_p$;
(b) designating ones of selected committed memory transmit reserve buffers as selected free memory transmit reserve buffers and associating the selected free memory transmit reserve buffers with free memory of pool $B_R$;
(c) designating ones of selected committed memory receive process buffers as selected free memory receive process buffers and associating the selected free memory receive process buffers with free memory of pool $B_p$;
(d) designating ones of selected committed memory receive reserve buffers as selected free memory receive reserve buffers and associating the selected free memory receive reserve buffers with free memory of pool $B_R$; and
(e) at least two of (a), (b), (c), and (d);
wherein the selected memory management policy includes using dynamic memory management including one of dynamic memory allocation, dynamic memory reclamation, and a combination thereof,
wherein dynamic memory management is adapted to selectively change buffer allocation from a first communication control data structure to a second communication control data structure;
wherein dynamic memory management is adapted to selectively change reserve buffer association from a first process buffer to a second process buffer; and
wherein the selected memory management policy is configured to maximize free memory.

31. The method of claim 30, wherein establishing the communication link across the communication network between the local host and the remote host further comprises establishing the communication link between the local host interface and the remote host interface using one of:
a predetermined network-layer protocol;
a predetermined transport-layer protocol; and
a predetermined network-layer protocol used in combination with a predetermined transport-layer protocol.

32. The method of claim 31, wherein the local host interface is a socket, and the communication control data structure is a socket control block.

33. The method of claim 32, wherein the establishing the communication link between the local host interface and the remote host interface comprises using the predetermined network-layer protocol in combination with the predetermined transport-layer protocol,
wherein the predetermined network-layer protocol is an Internet Protocol,
wherein the predetermined transport-layer protocol is a Transport Control Protocol,
wherein the socket is a Transport Control Protocol socket, and
wherein the socket control block is a TCP socket control block.

34. The method of claim 33, wherein at least a portion of the communication link comprises a physical air interface $U_m$, and establishing the communication link across the communication network between the local host and the remote host further comprises further comprises communicating across the portion using a predetermined wireless protocol.

35. The method of claim 25, further comprising:
allocating a process buffer from the process buffer pool $B_P$ into a transmit process buffer and a receive process buffer;
allocating a reserve buffer from the reserve buffer pool $B_r$ into a transmit reserve buffer and a receive reserve buffer;
cooperatively associating the transmit reserve buffer with the transmit process buffer, the transmit reserve buffer cooperating with the associated transmit process buffer to store transmitted messages in response to the existence of the first predetermined operational state; and
cooperatively associating the receive reserve buffer with the receive process buffer, the receive reserve buffer cooperating with the associated receive process buffer to store received messages in response to the existence of the first predetermined operational state.

36. The method of claim 35, further comprising:
monitoring the unallocated free memory for unallocated free memory diminishing to less than the predetermined memory level; and
if unallocated free memory diminishes to less than the predetermined memory level, storing messages in at least one of the transmit reserve buffer and the receive reserve buffer.

37. The method of claim 36, further comprising:
partitioning the reserve buffer pool into a transmit reserve buffer pool and a receive reserve buffer pool; and
if the unallocated free memory diminishes to less than the predetermined memory level, allocating the transmit reserve buffer from the transmit reserve buffer pool and the allocating the receive reserve buffer from the receive reserve buffer pool.

38. The method of claim 37, further comprising managing memory in the communication buffer, the process buffer, and the reserve buffer using one of memory allocation, memory reclamation, and a combination thereof.

39. The method of claim 25, wherein the second predetermined memory state is representative of unallocated free memory being less than a predetermined memory limit.

40. A communication system between a local host and a remote host, comprising:
a communication manager, disposed in the local host and adapted to wirelessly communicate a message with the remote host,
the communication manager including:
a process buffer configured to store the message wirelessly communicated with the remote host;
a reserve buffer, augmenting communication by the process buffer, configured to store the message upon the existence of a first predetermined operational state; and
a communication control data structure,
wherein the process buffer and the reserve buffer are allocated from unallocated free memory objects disposed in a global memory pool,
wherein the reserve buffer is configured to store only control messages in response to a second predetermined operational state,
wherein the process buffer and the reserve buffer are allocated to the communication control data structure,
wherein the first predetermined operational state is a state where an amount of unallocated free memory is less than a predetermined memory limit,
wherein the second predetermined operational state is a state where the process buffer exceeds a predetermined threshold;
a wireless network communication link, established to communicate the message between the local host and the remote host; and
a transceiver, coupled between the communication manager and the network communication link and disposed to transfer the message between the network communication link and the communication manager;
wherein unallocated free memory objects are memory objects which are not allocated and are write-enabled;
wherein at least the local host is a mobile wireless communication device having limited memory resources.

41. The communication system of claim 40, wherein the communication manager is responsive to a local process executing in the local host, the communication manager further comprising:
a communication interface connected to the local process and adapted to exchange messages between one of the process buffer and the reserve buffer and the local process; and
a communication control data structure characteristic of and allocated to the communication interface, wherein the process buffer and the reserve buffer are allocated to the communication control data structure.

42. The communication system of claim 41, wherein the communication manager further comprises a communication buffer disposed in the communication manager and including allocated memory objects, unallocated free memory, and a combination thereof,
wherein each of the communication control data structure, the process buffer, and the reserve buffer, are allocated memory objects in the communication buffer.

43. The communication system of claim 42, further comprising a communication buffer manager operably connected to the communication buffer and monitoring unallocated free memory for the existence of the first predetermined operational state, the communication buffer manager causing the message to be stored in the reserve buffer, responsive to the existence of the first predetermined operational state.

44. The communication system of claim 43, further comprising process buffers and reserve buffers allocated to the communication control data structure,
wherein ones of the process buffers designated transmit process buffers and others of the process buffers designated receive process buffers,
wherein ones of the reserve buffers designated transmit reserve buffers and others of the process buffers designated receive reserve buffers,
wherein selected transmit reserve buffers are cooperatively associated with respective transmit process buffers and selected receive reserve buffers are cooperatively associated with respective receive process buffers.

45. The communication system of claim 44, wherein the communication buffer is partitioned into a process buffer pool $B_P$ and a reserve buffer pool $B_R$, the process buffer being allocated from the process buffer pool and the reserve buffer being allocated from the reserve buffer pool.

46. The communication system of claim 45, wherein the local host communicates the message with the remote host over the network communication link using a predetermined network-layer protocol in combination with a predetermined transport-layer protocol.

47. The communication system of claim 46, wherein the predetermined network-layer protocol comprises an Internet Protocol, wherein the predetermined transport-layer protocol comprises a Transport Control Protocol, wherein the communication interface comprises a Transport Control Protocol socket, and wherein the communication control data structure comprises a TCP socket control block.

48. The communication system of claim 47, wherein a portion of the network communication link traverses a physical air ($U_m$) interface and wherein the local host communicates the message with the remote host over the portion of the network communication link using a predetermined wireless protocol.

49. The system of claim 40, wherein the second predetermined operational state is representative of unallocated free memory being less than a predetermined memory limit.

50. A mobile communication device for wireless communications and having limited memory resources, comprising:
   a transceiver disposed in the mobile communication device and configured to couple to a remote host over a portion of a communication network link using a predetermined wireless protocol; and
   a communication manager, disposed in the mobile communication device, connected to the transceiver, and configured to wirelessly communicate messages with the remote host,
   wherein the communication manager includes:
      a communication buffer having unallocated free memory,
      a reserve buffer allocated therein, and
      a communication control data structure,
         wherein the reserve buffer augments communications by the communication buffers, and
         wherein the reserve buffer stores the messages communicated with the remote host in response to the unallocated free memory diminishing to less than a predetermined memory level,
         wherein the reserve buffer is allocated from unallocated free memory objects disposed in a global memory pool,
         wherein the reserve buffer is configured to store only control messages in response to a predetermined operational state,
         wherein a portion of the communication buffer and the reserve buffer are allocated to the communication control data structure,
         wherein the first predetermined operational state is a state where an amount of unallocated free memory is less than a predetermined memory limit;
         wherein the second predetermined operational state is a state where the process buffer exceeds a predetermined threshold;
      wherein unallocated free memory objects are memory objects which are not allocated and are write-enabled.

51. The mobile communication device of claim 50, further comprising a process buffer allocated in the communication buffer, the reserve buffer being associated with the process buffer, the process buffer storing the messages communicated with the remote host substantially independently of the unallocated free memory diminishing to less than a predetermined memory level and cooperating with the reserve buffer to store the messages communicated with the remote host in response to the unallocated free memory diminishing to less than the predetermined memory level.

52. The mobile communication device of claim 51, wherein the communication buffer is partitioned into a process buffer pool and a reserve buffer pool, the process buffer being allocated from the process buffer pool and the reserve buffer being allocated from the reserve buffer pool.

53. The mobile communication device of claim 52, wherein the process buffer is allocated into a transmit process buffer and a receive process buffer, and the reserve buffer is allocated into a transmit reserve buffer and a receive reserve buffer, wherein the transmit reserve buffer is cooperatively associated with transmit process buffer and the receive reserve buffer is cooperatively associated with receive process buffer, wherein the transmit process buffer and the transmit reserve buffer are configured to store transmitted messages to the remote host, and wherein the receive process buffer and the receive reserve buffer are configured to store received messages from the remote host.

54. The mobile communication device of claim 53, further comprising:
   a local process executing on the local host and having a local process interface exchanging messages between the local process and the communication buffer; and
   a local host communication interface control structure corresponding to the local process interface and configured to communicate messages with a remote process interface in the remote host, the local host communication interface control structure communicatively cooperating with the process buffer and the reserve buffer, the process buffer and the reserve buffer being allocated to the local host communication interface control structure.

55. The mobile communication device of claim 53, further comprising a communication buffer manager connected to the communication buffer,
   wherein the communication buffer manager partitions the communication buffer into the transmit process buffer and the receive process buffer,
   wherein the communication buffer manager allocates the process buffer into the transmit process buffer and the receive process buffer,
   wherein the communication buffer manager allocates the reserve buffer into the transmit reserve buffer and the receive reserve buffer,
   wherein the communication buffer manager monitors the unallocated free memory, and
   wherein the communication buffer manager causes messages to be stored in at least one of the transmit reserve buffer and the receive reserve buffer, responsive to the unallocated free memory diminishing to less than the predetermined memory level.

56. The mobile communication device of claim 53, wherein the reserve buffer pool is partitioned into a transmit reserve buffer pool and a receive reserve buffer pool, and responsive to the unallocated free memory diminishing to less than the predetermined memory level, wherein the transmit reserve buffer is allocated from the transmit reserve buffer pool and the receive reserve buffer is allocated from the receive reserve buffer pool.

57. The mobile communication device of claim 53, wherein the communication buffer manager partitions the reserve buffer pool into a transmit reserve buffer pool and a receive reserve buffer pool and, responsive to the unallocated free memory diminishing to less than the predetermined memory level, wherein the communication buffer manager allocates the transmit reserve buffer from the transmit reserve buffer pool and allocates the receive reserve buffer from the receive reserve buffer pool.

58. The mobile communication device of claim 57, wherein the communication buffer manager implements one of dynamic memory allocation, dynamic memory reclamation, and a combination thereof, whereby unallocated free memory is maximized.

59. The mobile communication device of claim 57, wherein the communication buffer manager further comprises:
   a process buffer manager managing the process buffer, the managing comprising one of memory allocation, memory reclamation, and a combination thereof; and
   a reserve buffer manager managing the reserve buffer, the managing comprising one of memory allocation, memory reclamation, and a combination thereof.

60. The mobile communication device of claim 51, wherein the communication buffer manager selects at least one of a size of the process buffer and a number of process buffers allocated in the communication buffer responsive to one of an anticipated buffer size, an intended communication purpose of the local communication interface, a predetermined communication parameter, and a combination thereof.

61. The mobile communication device of claim 51, wherein the communication buffer manager selects at least one of a reserve buffer size and a number of reserve buffers allocated in the communication buffer responsive to one of an anticipated buffer size, an intended communication purpose of the local communication interface, a predetermined communication parameter, and a combination thereof.

62. The mobile communication device of claim 61, wherein the communication buffer manager further comprises:
   a process buffer manager managing the process buffer, the managing including one of memory allocation, memory reclamation, and a combination thereof, and
   a reserve buffer manager managing the reserve buffer, the managing including one of memory allocation, memory reclamation, and a combination thereof,
   wherein at least one of the process buffer manager and the reserve buffer manager maximizes unallocated free memory implementing one of dynamic memory allocation, dynamic memory reclamation, and a combination thereof.

63. The device of claim 50, wherein the predetermined operational state is representative of unallocated free memory being less than a predetermined memory limit.

* * * * *

UNITED STATES PATENT AND TRADEMARK OFFICE
CERTIFICATE OF CORRECTION

| | |
|---|---|
| PATENT NO. | : 7,707,320 B2 |
| APPLICATION NO. | : 10/655659 |
| DATED | : April 27, 2010 |
| INVENTOR(S) | : Singhai et al. |

It is certified that error appears in the above-identified patent and that said Letters Patent is hereby corrected as shown below:

Column 25, line 44, claim 1: "a local host interface a communication, control data" to read as --a local host interface, a communication control data--

Column 28, line 22, claim 13: "the a remote host interface" to read as --the remote host interface--

Column 28, line 31, claim 13: "the a remote host interface" to read as --the remote host interface--

Column 29, line 12, claim 17: "the a remote host interface" to read as --the remote host interface--

Column 29, line 16, claim 17: "the request the request" to read as --the request--

Column 32, line 26, claim 30: "of(a)" to read as --of (a)--

Column 33, line 2, claim 34: "further comprises further comprises" to read as --further comprises--

Column 33, line 35, claim 37: "the allocating the receive reserve buffer" to read as --allocating the receive reserve buffer--

Signed and Sealed this
Fourteenth Day of June, 2011

David J. Kappos
*Director of the United States Patent and Trademark Office*